Figure 1:
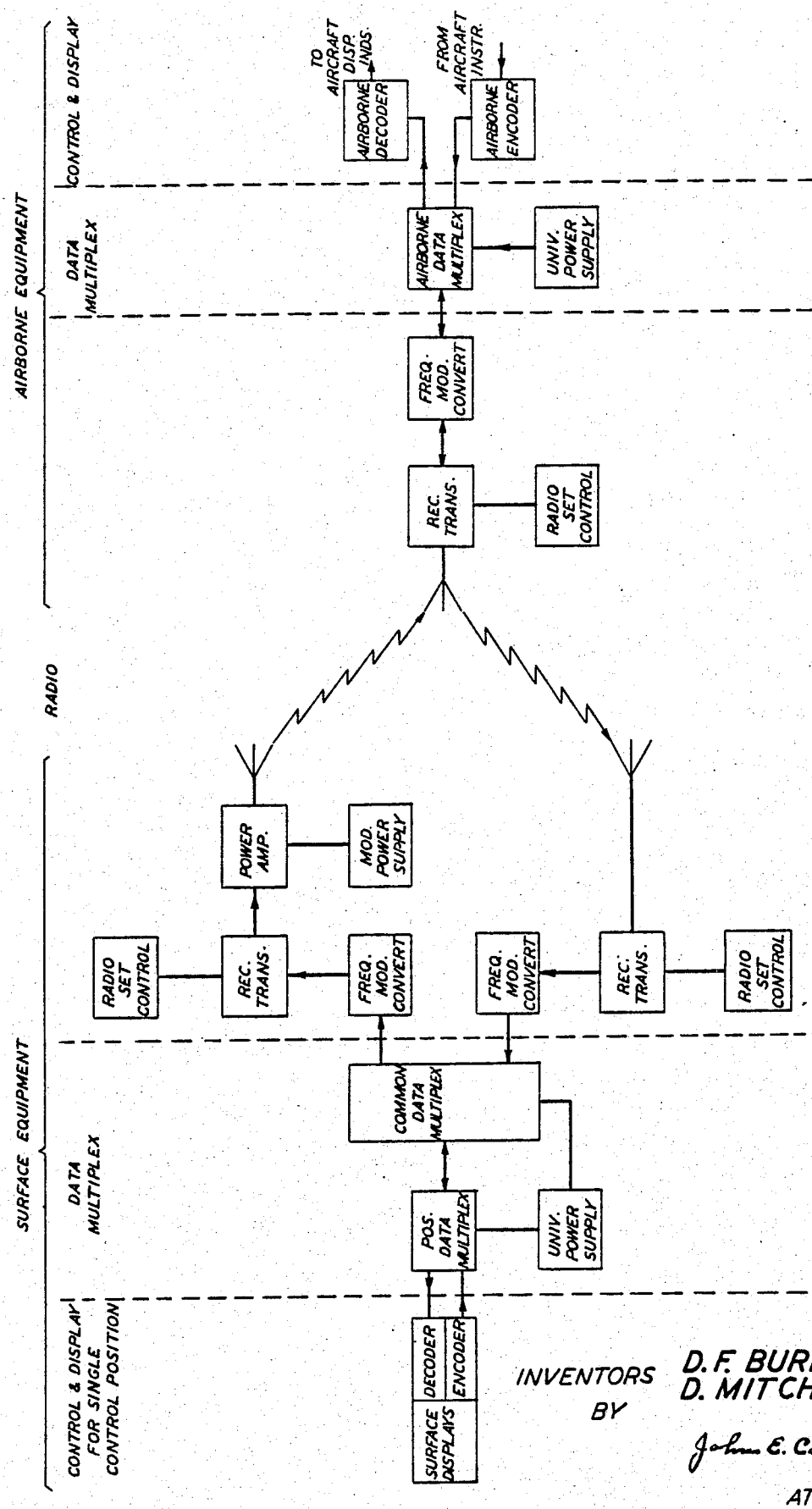

United States Patent
Burdett et al.

[11] 4,017,799
[45] Apr. 12, 1977

[54] HIGH SPEED MULTIPLEX DATA TRANSMISSION SYSTEM

[75] Inventors: David F. Burdett, Glen Ridge; Doren Mitchell, Martinsville, both of N.J.

[73] Assignee: Bell Telephone Laboratories, Incorporated, Murray Hill, N.J.

[22] Filed: Apr. 12, 1960

[21] Appl. No.: 21,836

[52] U.S. Cl. .................... 325/55; 179/15 AL; 179/41 A; 325/53

[51] Int. Cl.$^2$ ........................................ H04J 6/00

[58] Field of Search ............ 250/6.5, 6.51; 178/2.3, 178/322; 179/16, 41 A, 15 AL, 15 BZ; 325/53, 55

[56] References Cited
UNITED STATES PATENTS

| | | | |
|---|---|---|---|
| 3,118,018 | 1/1964 | Cornell et al. | 179/41 A |
| 3,141,928 | 7/1964 | Davey et al. | 325/55 |

*Primary Examiner*—Howard A. Birmiel
*Attorney, Agent, or Firm*—Joseph P. Kearns

EXEMPLARY CLAIM

5. A high-speed data transmission system comprising a central station, a plurality of control positions connected to said central station, a transmitter connected to said central station, an individual mobile station for each of said positions, means at said central station for polling all of said control positions to find any one of said positions which is ready to transmit to its individual mobile station, means at said central station, responsive to the finding of a control position which is ready to transmit, for connecting it to said transmitter, means in a control position connected to a transmitter for selectively directing intelligence to its individual mobile station, timing means at said central station for directing a reply from a selectively addressed mobile station to its individual control position after a measured interval and means at said central station, responsive to the elapse of said interval and the non-reception of a replay by any control position from its individual mobile station, for connecting that control position to said transmitter preferentially.

7 Claims, 7 Drawing Figures

INVENTORS D. F. BURDETT
D. MITCHELL
BY
John E. Cassidy
ATTORNEY

INVENTORS
D. F. BURDETT
D. MITCHELL
BY
John E. Cassidy
ATTORNEY

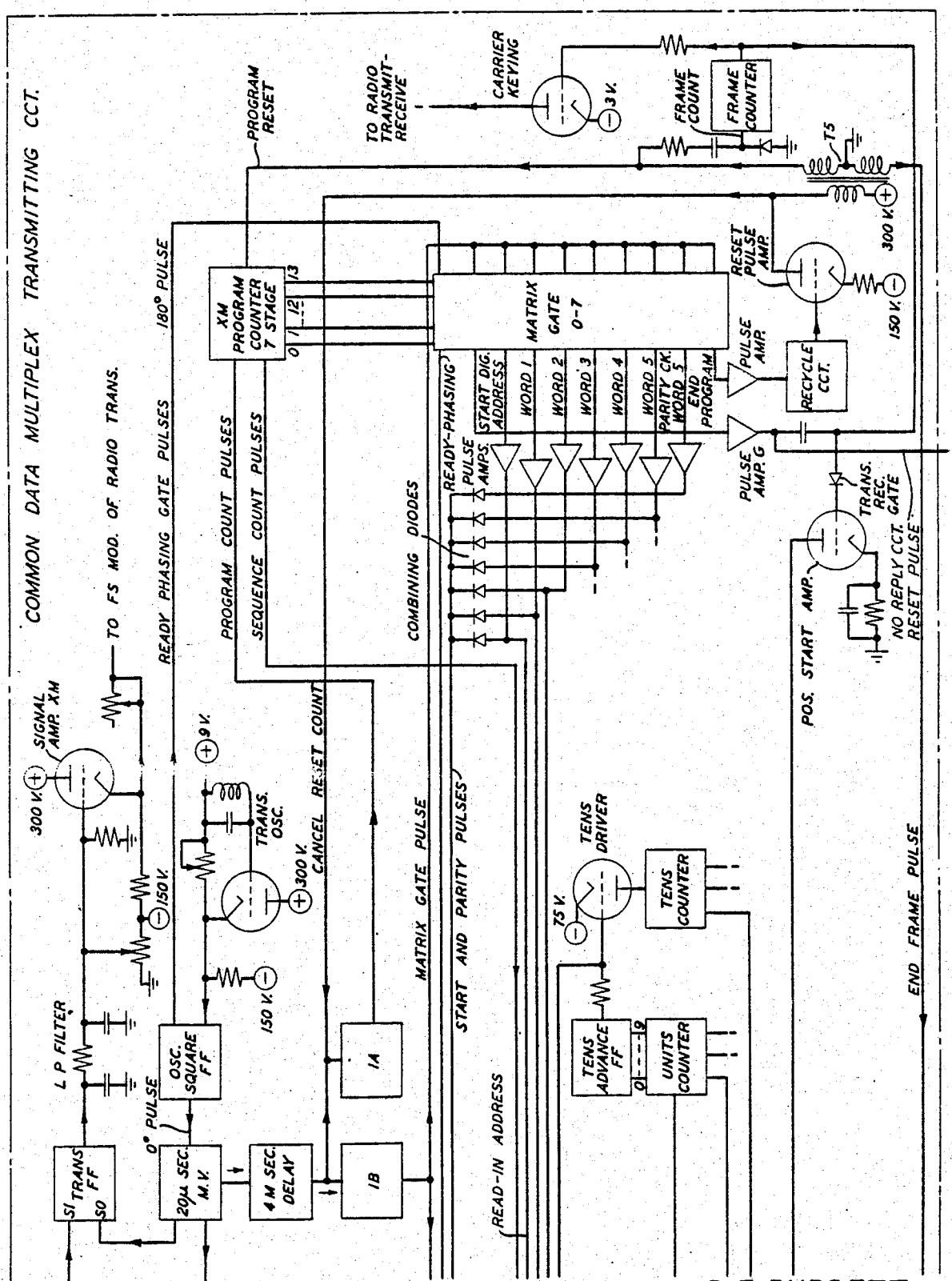

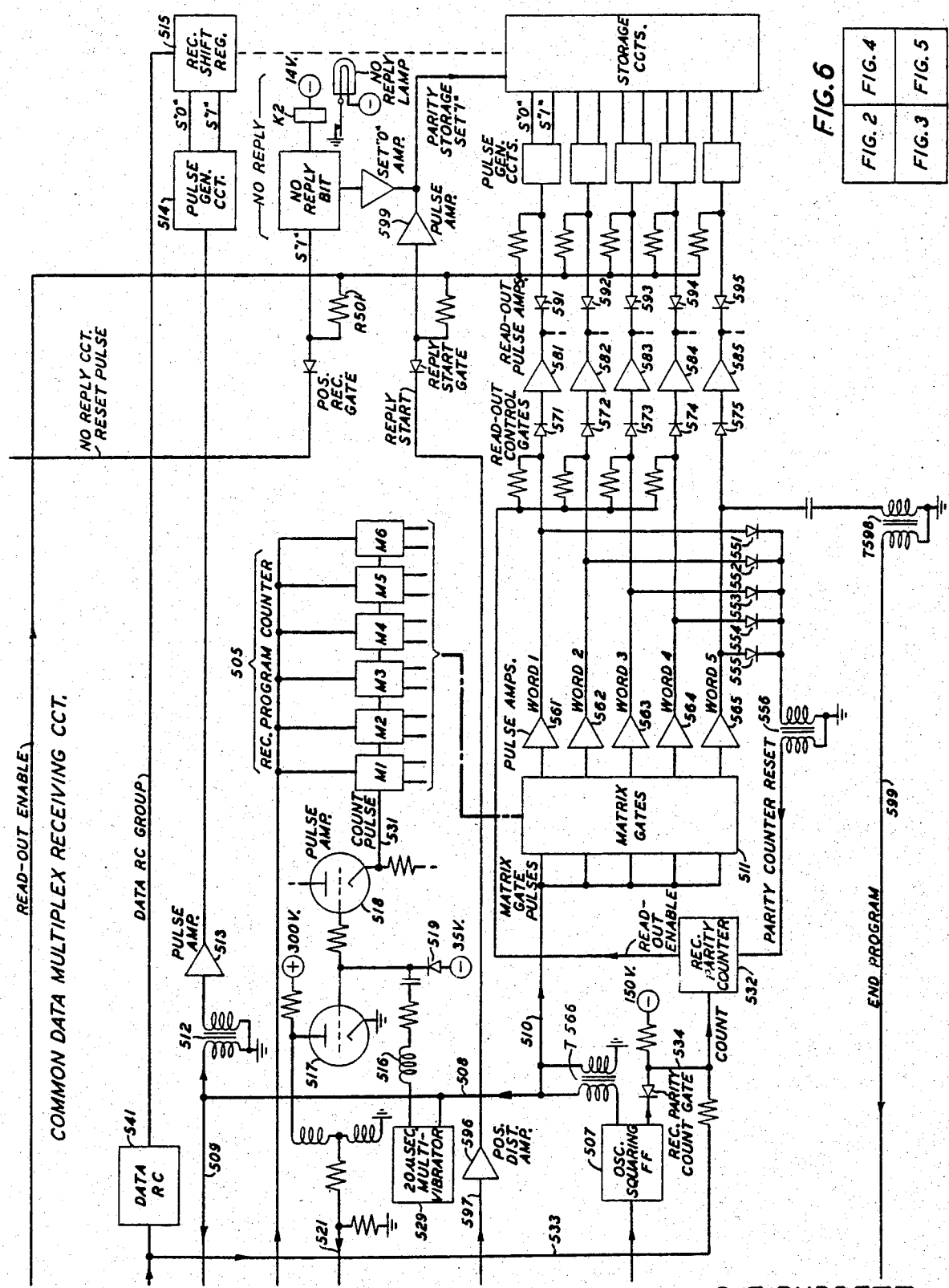

HIGH SPEED MULTIPLEX DATA TRANSMISSION SYSTEM

This invention is an improved high-speed time division multiplex start-stop two-way radio data transmission system in which information may be transmitted selectively between a control center and a large number of outlying stations. The original system, of which the present invention is an improvement, is disclosed in a patent application Ser. No. 549,402 filed in the names of J. R. Davey, D. Mitchell, B. Ostendorf and W. T. Rea, Nov. 18, 1955 which is hereby incorporated herein as though fully set forth herein.

An object of the invention is the improvement of high-speed telegraph systems.

The manner in which the original system of the invention functions will first be described generally as an aid in understanding the improvement of the present invention and the detailed description thereof hereinafter.

The original system incorporates arrangements whereby a single one of a large number of outlying stations may be selectively addressed from a control center and responsively the data receiving apparatus in the selected station is adjusted to receive information intended solely for the selected station, while all of the unaddressed stations in the systems are prevented from effectively receiving the information intended expressly for the addressed station. Thereafter, the selected station automatically transmits to the control station. It is to be understood that, instead of a single station, a plurality of the outlying stations may be arranged to be addressed simultaneously if desired by assigning to each of the plurality the same code signal station calling combination.

The invention in the present embodiment is incorporated in a data transmission system in which, following selection of the addressed station, data from the control center individual to the addressed station is effectively received by the addressed station exclusively, and data from the addressed station is thereafter automatically transmitted to the control center. Such a system may be defined, in one of its aspects, as a discrete address system, this term signifying that any one of the outlying stations may be individually selected or discretely addressed.

When a train of signals is addressed to a particular outlying station or when a return signal train is transmitted to the control center, each signal train, or frame, as it shall be called, at times, hereinafter, transmitted in a particular direction, consists of a fixed number of signal elements, each signal element of uniform duration so that all frames transmitted in a particular direction are of uniform duration. Transmission and reception are under control of oscillators and binary counters. There is one combined program and transmitting control oscillator and one combined program and transmitting control binary counter and one receiving oscillator and one receiving binary counter at the control center. There is a single oscillator and a single binary counter in each outlying station which jointly control the programming and the transmitting and receiving at the outlying stations.

In one application of the invention, the system is employed as a means of communicating from a control center, which may be an airport or a vessel, such as an airplane carrier, or another airplane to any one of a large group of airplanes in flight. The telegraph system operates on a multiplex or time division start-stop basis over a single radio channel in each direction. Each one of the airplanes or outlying mobile stations may be addressed whenever its individual control position at the control center has information to transmit. Each frame of signals generated at the control center intended for any particular outlying station or airplane will include in the first portion of the frame a sequence of signal elements which are preparatory signal elements. These include a first group of phasing signal elements followed by a waiting interval, equal in duration to an integral number of signal elements, and then a start signal element. The function of the phasing, waiting and start signal elements is to start an individual oscillator in all planes or outlying stations in proper phase and at the center of the start signal element. This portion of each train, that is the phasing, waiting and start signal elements, is followed by an individual code combination of signals defining the address of the particular called plane or station. All of the airplanes or stations, after having their individual oscillators started in proper phase will also receive the address signal combination in each frame and will then test the received address signal combination to see whether or not the received address combination corresponds to the address combination assigned to the particular plane. The plane which is identified by the correspondence of the received and assigned address combinations will thereupon condition its data receiving apparatus to effectively receive the remaining portion of the signal frame. The apparatus in all other planes will be restored to normal. The remaining portion of the signal frame will be divided into a plurality of code groups or combinations of elements, hereafter to be called "words," each word containing specific information, generally the magnitude of a quantity, intended for the single plane or mobile station which has been effectively addressed. Thereafter, the plane which has been addressed is arranged to automatically transmit a frame of signal elements containing phasing, waiting and start signal sequences and combinations defining words containing information, specific to the plane which was addressed, to the control center, such as the airport or carrier, where the words in the train are then directed to the individual control position corresponding to the addressed plane. No address or sending station identity is included in the frame transmitted from the outlying stations to the control center as, since in the present embodiment there is assumed to be but one control center, no address is required, and the message from the station is identified by its time relation to the addressed frame sent from the control center. Before the addressed plane transmits, the information in the words to be transmitted from the plane to the control center, such as the altitude, speed and bearing of the plane, will have been accumulated by being first measured automatically by proper instruments. The measurements will then be automatically translated into code signal combinations defining them. Certain items defined by one or two signal elements of a word group may be set up manually by the plane operator.

In general, after the address, the information contained in the code combinations of signals defining the words in each frame, which is transmitted in either direction between the control center and the station will depend upon the particular needs of the system in which the invention is applied. In an airport traffic control system, the individual items of information may relate, for instance, to weather reports, visibility, traffic density, cruising altitude allocation, etc. In another application, they may comprise code signal combinations to control the performance of functions such as the reading of meters and the automatic retransmission from the addressed station to the control center of code signal combinations or words defining the usage of utility services at remote stations, or the reading and retransmission of code signal combinations defining barometric pressure, temperature, wind velocity, etc. at outlying weather observatories in a weather system.

Since, in the present embodiment, the invention is assumed to be incorporated in a system wherein a large number of friendly airplanes in flight are directed, from a ground control center or from an airplane carrier, on individual missions, for instance, to intercept enemy planes, the information in the words is designed to facilitate this objective. The enemy planes will ordinarily be flying on different courses at different altitudes and at different speeds from the friendly planes. The information received by the individual airplane is intended to enable the pilot of the addressed plane to adjust his direction, altitude and speed to effect the interception. The addressed plane in turn transmits information as to its own specific bearing, speed, altitude, etc. to the control center.

The rate at which the signal elements comprising the various frames, addressed from the control station to the individual aircraft, are generated at the control terminal is under control of the combined program and transmitting control oscillator at the control terminal. The individual program oscillator in each airplane, after being set into operation under control of the incoming signals preceding the address signals in each frame, operates at the same frequency as that of the transmitting oscillator at the control center.

The signal elements in each time slot in each frame are pulses which may be of either of two conditions. These two conditions will hereinafter be termed "1's" and "0's", respectively. Omitting for the present a consideration of the preliminary phasing, waiting and start pulses, it is pointed out that in the present embodiment the address and each of the words in each frame consist of 12 signal elements arranged in any combination of 1's and 0's which taken together define intelligence, such as a quantity, for instance, and a final 1 or 0 used as a check or parity count, to be described hereinafter, making a total of 13 signal elements in each address and in each word in each frame.

In the present embodiment, the control center or carrier will first address and transmit to two planes in succession. Then the transmitter at the control station will be shut off and its receiver will be adjusted to receive from these two planes. Then the cycle will be repeated with two other planes. This necessitates circuits to control the cycles of transmitting and receiving both at the control terminal and at each outlying station. In the present embodiment, an individual radio transmitter and an individual radio receiver will be employed at the control terminal. To economize in the weight of the airborne equipment, in the case of the planes, a combined radio transmitter and receiver will be employed and it will be controlled so as to receive and transmit at the proper times.

The code combinations defining the address and the data which are to be transmitted from the control terminal to the aircraft may be set up at the control terminal at individual positions for each plane or outlying station. Before any individual position is connected to the common multiplexing equipment at the control center, the code combination defining the address may be established, for instance, by actuating each of a plurality of contacts to either its closed or open position. If it is assumed that 12 contacts are employed, the total number of code combinations which may be produced and of individual planes or outlying stations which may be addressed is $2^{12}$ or 4096. An individual control position is arranged to generate and transmit some particular one of these addresses and its corresponding controlled plane is assigned the same one of the addresses. The items of information or words may be produced, for instance, by adjusting dials at any position so that they are in registry with encoding means which produce a code combination of signals identifying a quantity defining a measurement. The dials may be arranged so that they present opaque or translucent areas in the paths of light beams directed to impinge on phototransistors which generate pulses defining code combinations corresponding to the positions of the dials. These contacts, or dials, or other means, will be positioned in advance manually, mechanically or electrically and all of the code combinations defining the address and each of the words will be impressed, each combination in its entirety, and the various combinations in sequence, first on a transmitting shift register which forms a part of each individual plane control position at the control center. The transfer of the information from the encoding devices at a control position to the shift register at the same position will be under control of the common multiplex equipment at the control center. This common equipment includes electronic gates opened under control of a transmitting binary counter at definite numbered positions in a single frame. The common equipment includes also the combined program and transmitting control oscillator at the control center which drives the combined program and transmitting control binary counter to count the total number of signal elements to be transmitted in each frame. At certain predetermined counts in this counting process, the combined program and transmitting control binary counter opens the various gates, known as matrix gates, which in turn control the transfer of information set up on the address contacts and on the word defining dials, at some one selected control position which has been found ready to transmit, to an individual transmitting shift register at the same control position. This position circuit is connected to the common multiplex circuitry as a result of the selecting process. One particular control position transmitting shift register at a time is connected to the common transmitting equipment as it is found ready to transmit. The transmitting shift register in each control position may have as many storage elements in it as there are elements in the signal combination defining the address and defining each of the words. In the present instance, it is assumed that the address and each of the words has 12 elements. The transmitting shift register therefore will have 12 storage stages. In the common multiplexing equipment there is an individual matrix gate controlled by the common program and transmitting control binary counter for the address and for each word in each signal frame transmitted to the planes. When the gate for the address is opened, for instance, the code combination, which has been set up at any control position on the 12 contacts defining the address of the particular plane which is to be called by the particular control position, will be transferred simultaneously to the 12 storage stages of the transmitting shift register at that particular position. Deferring for the present a description of the generation of a preliminary group of signals which control the starting of the individual oscillator in each plane and the generation of a parity checking pulse which is added to the address and to each word by the common equipment, both of which operations will be described hereinafter, as the program and transmitting oscillator continues to function, these 12 signals defining the address, assumed now to be stored in the 12 stages of the shift register at the position connected to the common multiplex equipment, will be read out individually in sequence and applied first to a flip-flop circuit in the common multiplexing equipment, which is also controlled by the program and transmitting oscillator, and then will modulate the radio transmitter at the control terminal. After the address has been transmitted, when the program and transmitting binary counter has reached the proper count, another matrix gate will open and the 12 elements defining the first word will be read simultaneously into the selected control position's transmitting shift register and read out of it one element at a time and impressed first on the flip-flop circuit in the common equipment and then on the radio transmitter. This process will be repeated until all bits of information or words required to be transmitted in a single train for a single plane have in fact been transmitted.

In each program of operation, as mentioned, the control center first effectively transmits to a first plane and then to a second plane and then receives from the first plane and then from the second plane before repeating the program. After the first plane or station receives and while the second plane or station is receiving, the single combined radio receiver-transmitter in the first plane, or station, is switched to the transmitting condition. After the second plane or station has received, the first plane or station transmits to the central station. After reception by the radio receiver and the common receiving equipment in the multiplexing equipment at the central control station, the direction of the signal trains, incoming from the planes, to their respective individual control positions depends upon the control of receiving gates individual to the positions which are opened only at proper times in the four-frame cycle.

While the first plane or station transmits, the second plane or station switches its combined radio receiver-transmitter to the transmitting condition and after the first plane or station has finished transmitting to the control center, the second plane or station transmits, completing the program.

The information to be transmitted to each plane or station will be accumulated at the individual control position for each plane or station at the control center. Each individual control position is arranged so that it may be effectively connected to the common transmitting equipment at the control center on a when-ready basis. All of the positions are polled in an ordered sequence to determine if any is ready to transmit. When a control position has information to transmit, it will apply a condition to a gate which is arranged to give access to the common control equipment. The polling of the individual positions for the ready-to-transmit condition is under control of the program and transmitting oscillator and its binary counter at the control center. The first control position, in the ordered polling sequence, found to be ready to transmit, will be effectively connected to the common transmitting equipment in the control center at the start of the next following transmitting cycle. The polling for a position ready to transmit is carried on continuously during the counting of a program, being arrested only when one is found ready until it is connected to the common equipment, to prevent loss of time.

As stated in the foregoing, the oscillators in each plane or outlying station are set into operation in response to the preliminary or phasing, waiting and start signal elements in each frame transmitted from the control center. The address of the called plane or station is received by all planes or stations.

Each program oscillator in each plane or outlying station, once started, runs in phase with that of the transmitting oscillator at the control station. The cycles of operation of the oscillators, in the plane or outlying station, following the start signal are counted by the individual program binary counter in the planes or outlying stations. During the first cycle of operation of the oscillators in the planes or outlying stations, the first signal element of the address is received and during the following cycles of operation of the oscillator in the planes or outlying stations, the succeeding signal elements of the address are received. The total number of elements in the address are counted under control of the binary counter in the planes or outlying stations. They are impressed on an individual receiving shift-register in each plane, one signal element at a time, until all of the address signal elements have been received. Then the entire address is tested in all of the planes or stations as a unit under the joint control of the program binary counter, a matrix gate which is responsive to the binary counter and an address-recognizing gate in each plane or station. If the address is not that of a plane or outlying station, upon failing to recognize the address, the oscillator in the plane or station is stopped. If the address is correct the oscillator in the addressed plane continues to operate and the program binary counter to count. In the properly addressed plane, as each data signal element defining a word is received, it is impressed on the shift register in the plane, one element at a time, until all of the elements of the first word are stored in the shift register of the addressed plane. The incoming signals receive a parity count. If the count is satisfied, at the end of reception of the word, as indicated by the count of a parity binary counter, an individual matrix gate for the first word permits a pulse to pass, which transfers the word standing in the shift register to a storage device which has one storage element for each signal element in the word. The transfer from the shift register to the first-word-storage array in the addressed plane is performed simultaneously, all of the signal elements comprising the word standing in the shift register being read out of the shift register into the individual storage array for the first word at the same time. The oscillator continues to operate and the program binary counter to count its cycles as the second word is being received. The signal elements of the second word are also impressed on the shift register in the plane, one element at a time. After the last element is received, the plane program binary counter again controls an individual matrix gate to permit a pulse to pass, which, assuming that the applied parity count check for the word has been satisfied, transfers the word from the shift register to an individual storage array for the second word. The third, fourth and fifth words are similarly treated.

At the end of reception of the last word in the frame, the outlying plane or station must be conditioned to transmit. It takes time to do this. The combined radio receiver in the plane must be switched over from the receiving to the transmitting condition. It is important in a high-speed system that this time should not be lost. This is the primary reason for transmitting to two planes or stations in succession and then receiving from them.

At the control center, the first signal element of the second frame which is transmitted starts immediately after the termination of the transmission of the last element of the first frame, with no interval between. The program binary counter in the first addressed plane, therefore, under control of its oscillator, counts a number of signal intervals equal to the number of signal elements in the second frame transmitted from the control center. During this interval the combination radio receiver-transmitter in the first addressed plane has been switched to the transmitting condition and immediately following the counting of the last signal element of the frame transmitted to the second plane, the first plane automatically transmits a frame of signal elements to the control center without any delay.

The first portion of the frame which is transmitted from a plane or station to a control center is a group of preliminary signals, comprising phasing and waiting signal elements, followed by a start signal element. This portion is similar to the first portion of a frame transmitted to a plane. There are two oscillators at the control center. In addition to the program and transmitting control oscillator which runs continuously and operates its individual program binary counter to count continuously, there is a receiving oscillator which is normally at rest, as is the single oscillator on a plane, and which, like the oscillator on a plane, is set into operation in response to the preliminary signals of a received frame. The receiving oscillator at the control center has an individual receiving binary counter. There is an individual matrix gate for each incoming word. The data signals in the incoming frame from each plane or station are directed to the particular control position which has addressed that plane or station. The directing to the same control position is dependent upon counting the frames on a time basis under the control of the program oscillator, an individual frame binary counter at each position and a gate. Each individual control position has a single receiving shift register and an individual storage register for each word. The signal elements of each word are applied successively to the receiving shift register of the individual control position assigned to the plane or station. After the shift register has been filled with any word, all of the signal elements comprising the word are first checked for parity count and, if the parity check is met, are then read out simultaneously under control of the receiving binary counter and the individual matrix gate assigned to the word, which gate is activated to pass a word read out pulse at the proper count. Each word is thus read out in turn to an individual word storage register for each word at the control position individual to the plane which transmitted them. Then the words are used to control various devices. As explained the words ordinarily define magnitudes. The signal elements of the words are applied to translating devices which translate them into voltages, for instance, the magnitudes of which are linearly related to the magnitudes defined by the signal combinations of the words. The voltages are then applied to indicators or servo mechanisms.

After the reception by the control center of the first signal frame from a first plane and while the combined program and transmitting oscillator and counter continue to run, the receiving oscillator at the control center and its individual receiving binary counter are stopped. They are set into operation again by the preliminary signals of the frame from the second plane. Then the following data signals of this second frame are directed to the individual control position assigned to the second plane. The words of the second frame are received and treated in the manner explained in the foregoing and at the termination of reception of the signal elements of the frame from the second plane, the receiving oscillator, and its individual binary counter at the control center are stopped.

It has been explained that the combined program and transmitting oscillator and its individual binary counter at the control center run continuously. This binary counter operates through a number of cycles corresponding to the number of signal elements in the first frame transmitted to the first of two planes and then automatically recycles after counting the final signal element of a frame. It then repeats for the second frame transmitted to the second plane. Each group of signal cycles generated by the oscillator, corresponding to the number of signal elements in a frame, or, in other words, each frame, is counted. At the end of the second frame, the transmitter at the control center is turned off. The program and transmitting oscillator and binary counter at the control center continue to function, however. When it has counted the number of signal elements corresponding to the number in a third frame as transmitted from the control center, it recycles and counts for a fourth frame even though no signals are being transmitted from the control center during these intervals and, at the end of this time, it again turns on the transmitter.

During the third and fourth frame countings, while a number of transmitting oscillator cycles, corresponding to the number of signal elements in each of two frames as transmitted from the control center are being counted, the two frames from the two planes are being received. It is particularly pointed out that even though the program and transmitting oscillator and its individual binary counter continue to function during the interval while the two frames from the two planes are being received, neither one of these circuits plays any part in the receiving and counting of the signals in an incoming frame at the control center. The receiving function at the control center is under control of a receiving oscillator and a receiving binary counter.

It is particularly pointed out that each individual control position at the central station has a counter which is under control of the frame counter in the common multiplex, and which counts the frames while the position is connected to the common multiplex equipment. This serves as a program control of the position which opens an individual position transmitting gate between the position transmitting shift register and the common multiplex transmitting equipment at the proper time and which also opens the position receiving storage circuits at the proper time.

One reason for operating the program transmitting oscillator and the program and transmitting binary counter during the interval while the two frames from the planes are being received is to count an interval long enough to permit the two frames from the two planes to be received and then to turn on the transmitter again and to control the transmission to another set of two planes without interruption if there are in fact individual control positions ready to transmit.

It is particularly pointed out that, whereas the number of signal elements in each frame transmitted from the control center to each plane must be the same and the number of signal elements transmitted in each frame from each plane to the control center must be the same, the number of signal elements in each frame transmitted from the control center to the planes must usually be greater than the number of signal elements in each frame transmitted from the planes to the control center. Since it is impractical to equalize the round-trip transmission time between the control center and the planes, the frame length transmitted by the planes must be shorter than the frame transmitted by the control center by at least an amount equal to the round-trip transmission time to a plane at the maximum range of the system.

With the foregoing as background, the improved system of the present invention will now first be described generally. It was stated in the foregoing that the individual control positions transmit to their respective planes or outlying stations on a when-ready basis. That is to say, when any control position has any information to transmit to an outlying plane, it places a condition on a selecting circuit which forms part of the common multiplexing equipment. Each control position has selectable elements in the selecting circuit. The selectable elements assigned to all of the control positions are polled, as mentioned, in an order sequence. When the common multiplexing equipment finds selectable elements individual to any position which is ready to transmit, it effects the selection of the associated control position and at a proper time in the programming cycle it connects the position to the common equipment.

In accordance with the present invention, the rate at which any individual position may place a condition on its selectable elements in the common multiplexing equipment to obtain access thereto is made variable. The present improvement affords means whereby any position may be given access to the common multiplexing equipment on a preferred basis. Further, this affords what will be termed hereinafter a readdress feature, whereby a called plane or an outlying station which has not responded by transmitting to the control station in the time slot reserved for this function may be readdressed in a shorter than normal interval. The circuit is arranged so that a plane which has been addressed and to which information has been transmitted, and which has not responded in normal course may be readdressed once, twice, or three times to determine if communication with the particular plane is possible.

An object of the present invention is to afford a readdress feature in a multiplex data transmission system, whereby a particular outlying station may be addressed on a preferential basis.

The invention may be understood from a consideration of the detailed description hereinafter when read with relation to the associated drawings which taken together disclose a preferred embodiment in which the invention is presently incorporated. It is to be understood, however, that the invention is not limited to incorporation in the present embodiment, but may be incorporated in others which may be suggested to those skilled in the art by the present disclosure.

IN THE DRAWINGS

Figure 2:
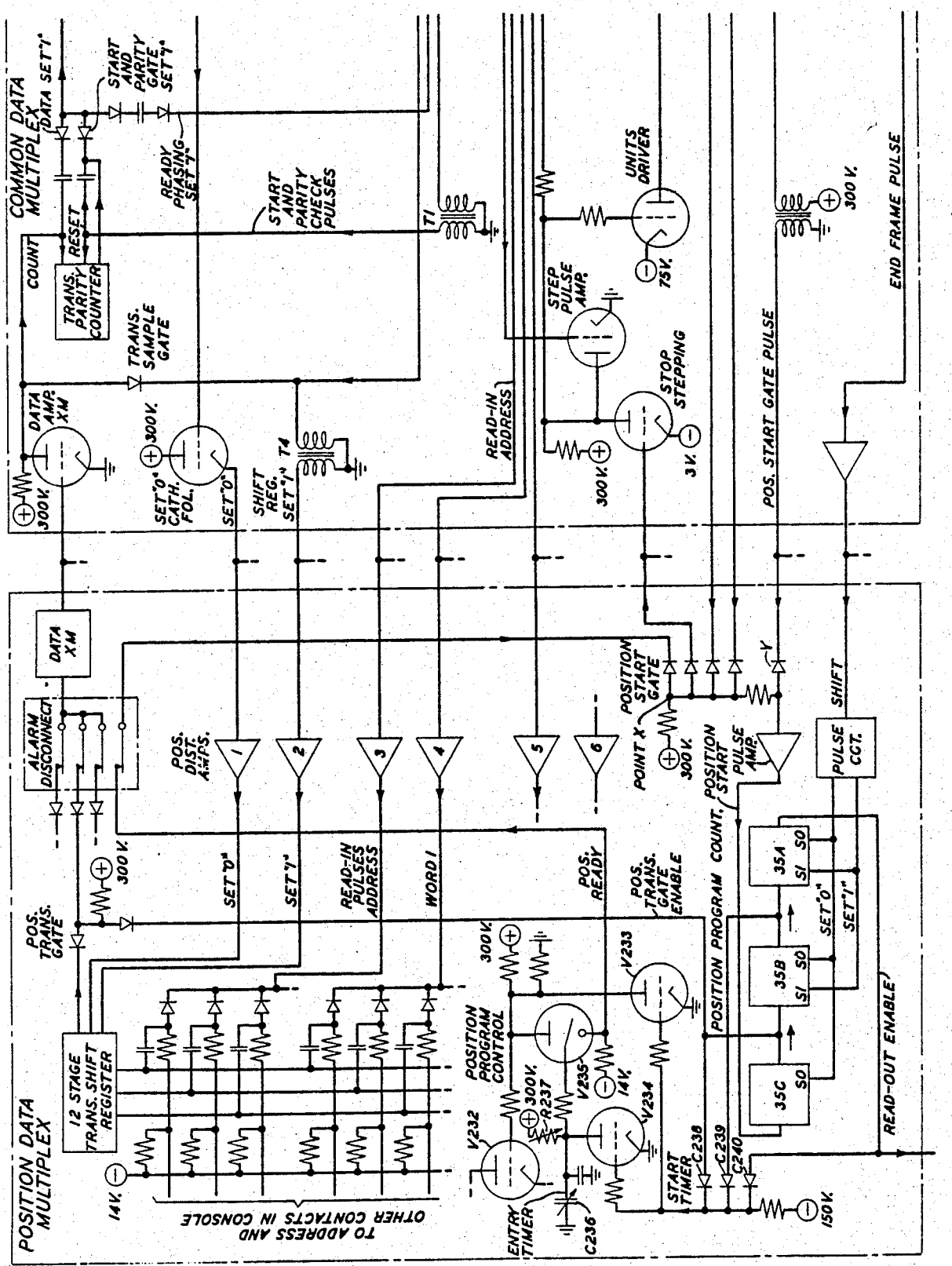

FIG. 1 shows by means of captioned rectangles a diagram of the overall system to which the improvement of the present invention is applied;

FIGS. 2, 3, 4 and 5 when arranged as in FIG. 6 show, largely by means of captioned rectangles, the circuits located at the control center;

The left-hand portion of FIG. 2 discloses the elements comprising a position control circuit. The right-hand portion of FIG. 2 and FIGS. 3, 4 and 5 shows the common data multiplexing circuit. The right-hand portion of FIGS. 2 and 4 shows the programming and transmitting circuit of the common data multiplex.

Figure 3:
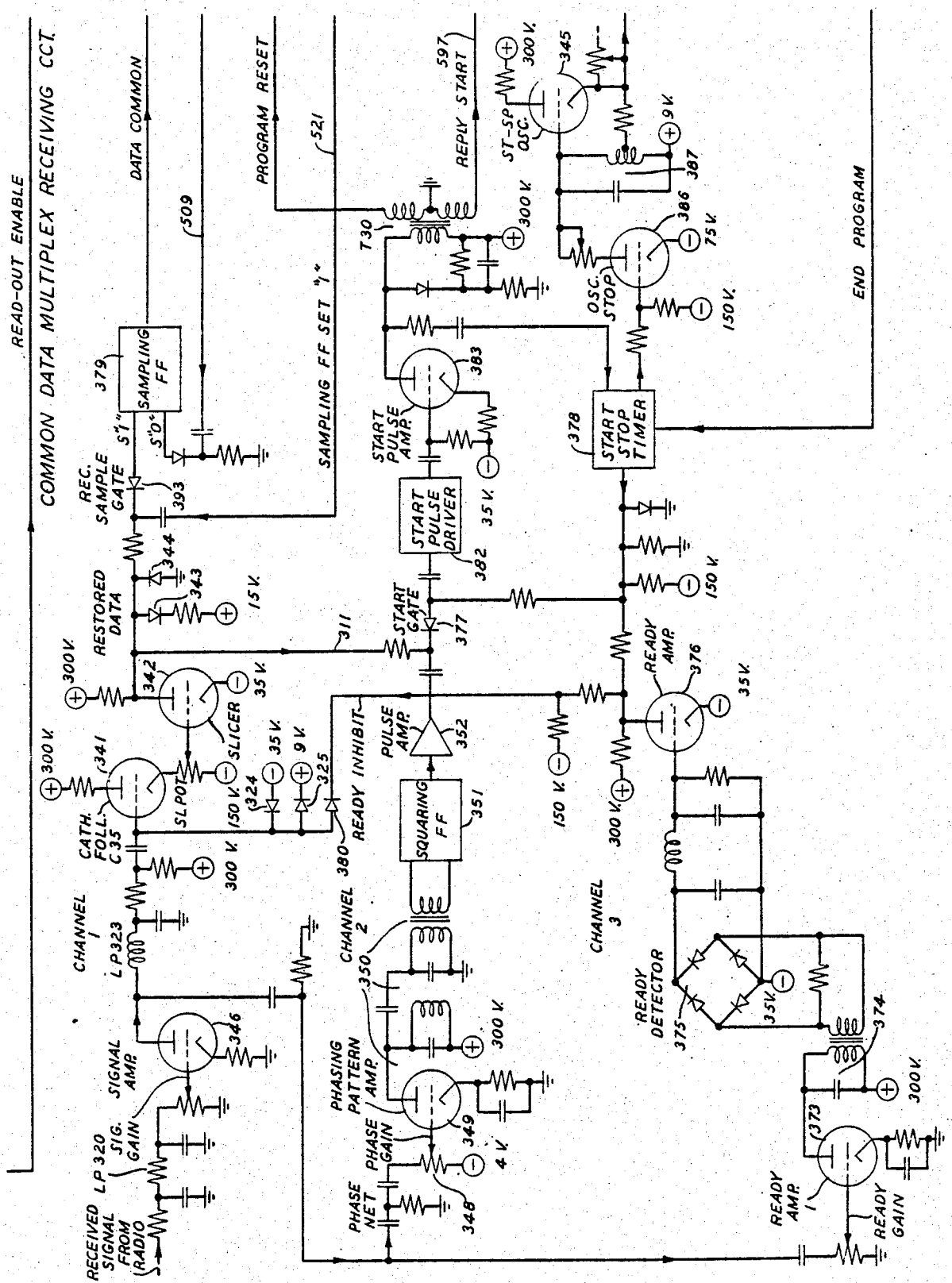
Figure 7:
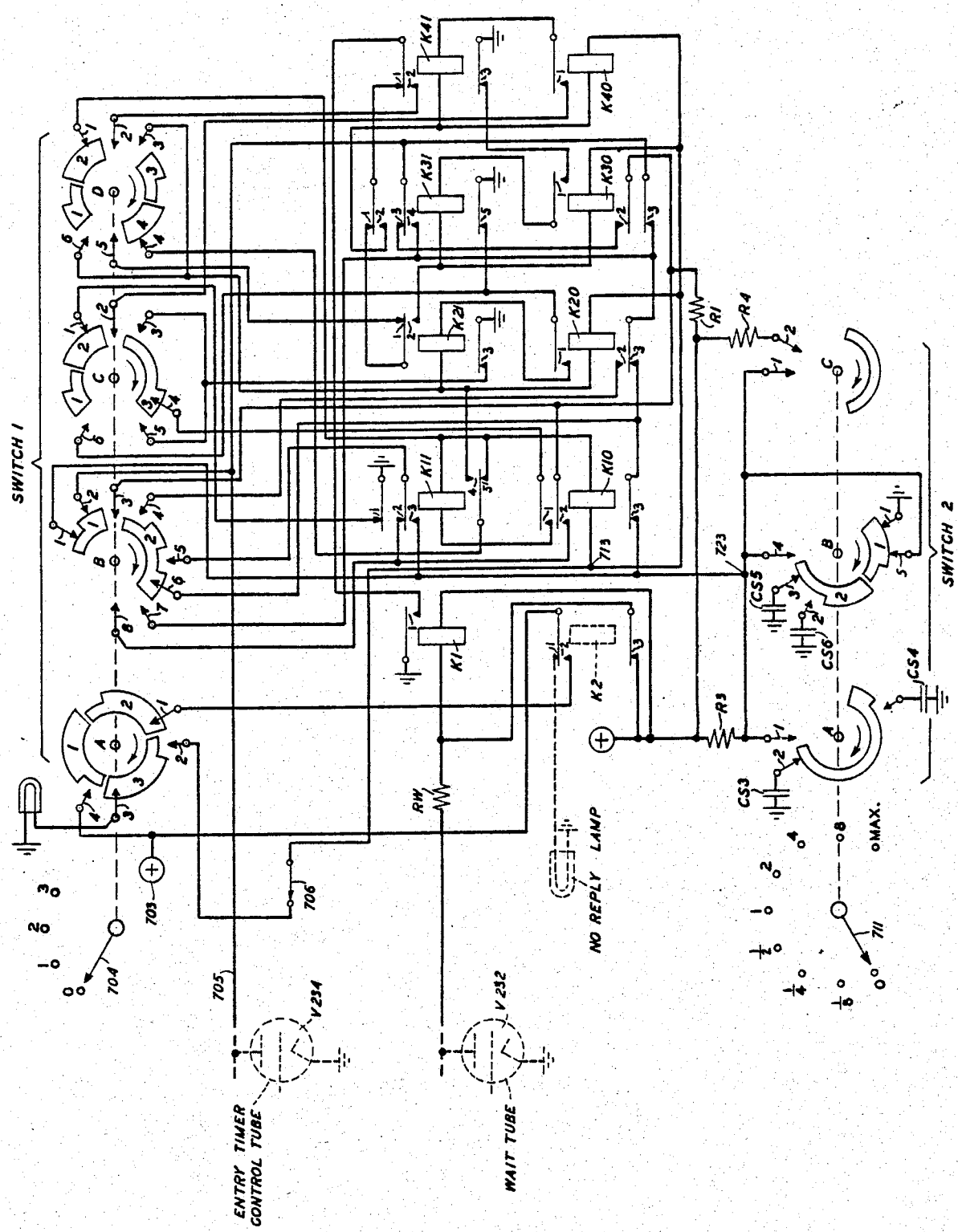

FIGS. 3 and 5 show the receiving portion of the common data multiplex transmitting circuit; and FIG. 7 shows the readdress circuit of the present invention.

The message rate of the system may be, for instance, approximately 29 messages and replies per second. In a system which has, for instance, only 100 planes, this rate can be divided as follows:

(a) one message to each of 100 aircraft in approximately 3½ seconds;

(b) approximately 14.5 messages per second to each of two aircraft;

(c) in accordance with the present invention as mentioned in the foregoing, aircraft may be served at different address rates and this procedure may be carried on simultaneously. Therefore, any combination of number of aircraft and associated address rates between the two extremes stated above may be served up to the system message capacity of approximately 29 messages per second.

The available message rate, which are selectable by means of a switch at each control position, are one message per 8, 4, 2 or 1 seconds or 2, 4, 8 or maximum (approximately 14.5) messages per second.

When the readdress feature is employed, as soon as a reply is received, or after the specified number of readdress attempts have been made, service to the aircraft in question returns to the normal rate.

Refer now to FIG. 1. A complete message sequence from surface to aircraft and return will now be explained by means of the block diagram of FIG. 1. The left-hand portion of FIG. 1 shows the surface equipment and the right-hand portion of FIG. 1 shows the airborne equipment. At the left in FIG. 1 is shown the control and display equipment, the encoding and decoding equipment, the position data multiplex equipment and the power supply assumed to be located at each single control position. It is to be understood that although but one is shown, ordinarily a large number will be employed. Immediately to the right of the equipment for a single control position is shown the data multiplex equipment which is common to all positions. The radio transmitting and power equipment for the surface control center is shown in the upper left center of FIG. 1 and the radio receiving equipment for the surface equipment is shown at the lower left central portion of FIG. 1. The combined radio receiver and transmitter together with its control equipment in each aircraft or outlying station is shown at the right center in FIG. 1. Immediately to the right thereof is shown the multiplex equipment and the power equipment for each aircraft or outlying station. And at the extreme right in FIG. 1 is shown the decoder which controls the display equipment on which information from the ground station is displayed and the encoding equipment which encodes data set up in the aircraft for transmission to the surface station.

Data to be transmitted to its individual control aircraft or outlying station is set up in the equipment marked "Surface Displays" at the extreme left in FIG. 1 and impressed on an encoder which encodes it in permutations of binary signals. This data is then transferred to the position data multiplex circuit. Then the data is transferred under control of the polling and selecting circuit, not shown, in the common data multiplex circuit to the common data multiplex circuit. The transfer from the encoding apparatus to the position data multiplex circuit is on a parallel basis, that is, all of the information in the encoder is read in parallel to the position data multiplex circuit during one cycle of operation of the combined program and transmitting oscillator. The transfer from the position data multiplex to the common data multiplex is on a sequence basis, that is to say, each signal element is read out in sequence during a single cycle of operation of the program and transmitting oscillator and binary counter. The common data multiplex equipment accepts the serial data from the position equipment and adds the preliminary phasing, waiting and start signal at the head of each train. It also adds a parity checking signal to the address and to each word. The message appears at the output of the common data multiplex equipment in a form suitable for driving the reactance modulator in the frequency modulation converter. The common data multiplex also contains the timing and programming circuits which control the sequence of operation.

The frequency modulation converter generates a frequency shift key signal which may be, for instance, of 3.45 mc ± 20 kc, which is fed through a coaxial cable to the receiver-transmitter where it is amplified and heterodyned with crystal control signals to the desired operating frequency in the 225-400 mc band. The output of the receiver-transmitter is amplified from about 10 watts to a level of about 100 watts in a power amplifier and radiated by a suitable antenna system.

When the signal is received by the airborne receiver of the combined receiver-transmitter, it is amplified and heterodyned to a final intermediate frequency of 3.45 mc and fed by a coaxial cable to the frequency modulation converter. The frequency modulation converter contains circuitry for limiting amplitude variations in the received signal and for detecting by a discriminator. The detected signal is fed to the airborne data multiplex equipment. The synchronizing signals at the head of each train are used to start and lock the local oscillator in the airborne multiplex in step with the incoming signals. Detection of the start signal by a gate circuit that anticipates its arrival from the synchronizing signal indicates that correct synchronization has been accomplished. The received address is then compared with the aircraft's preset address and if they coincide, the data are accepted, given a parity check for errors, and are put into storage on a digital basis. The data than remain in storage until displaced by the receipt of a new error-free frame of signals. In the event that any condition of synchronism, address, or parity check is not met, the old information remains in storage, and the equipment remains quiescent until the next message frame is received. The data are recorded in the airborne decoder equipment and displayed on the airborne display indicator and control.

After receipt of a message, the airborne data multiplex supplies signals to the receiver-transmitter to cause it to switch to its transmitting condition, and a return message similar in structure to that received, but containing no address, is automatically transmitted. This message consisting of information on aircraft position and status, is automatically encoded by the airborne encoder equipment which is fed from signal tapes on the aircraft's instrumentation. The code disc located on the encoding unit shaft performs a shaft-to-digital conversion. No address is needed on the air-to-surface message because the surface equipment recognizes the return message by its time sequence in relation to the surface-to-air message and directs it to its individual control position.

The aircraft message received at the surface equipment is detected in a frequency modulation converter. It is processed by the common data multiplex equipment for synchronization and start signals. A parity check is applied and the words in the incoming frame are routed to the position data multiplex equipment which originated the corresponding surface-to-air message. The position data multiplex equipment converts the serial data to parallel form, stores it on a semi-permanent basis, and then feeds the information to a control console where suitable digital-to-shaft or other conversions are made, and the information is displayed on indicating devices.

Refer now to FIGS. 2, 3, 4 and 5 arranged as in FIG. 6. These figures, so disposed, show in somewhat more detail the arrangements described generally with relation to FIG. 1. The operation of the basic circuit to which the readdress feature, which is the subject of the present application, will first be described and thereafter the operation of the readdress feature will be described in detail.

First the manner in which the timing pulses are generated which control the operation of the system will be described. The program of the data transmitter is timed by the continuously running program and transmitting timing oscillator tube TRANS OSC shown in the upper middle portion of FIG. 4. The oscillator produces a sine wave which is fed to the oscillator squaring flip-flop tube OSC SQUARE FF which squares the sine wave and produces a trapezoidal wave with steep transitions. The squaring circuit provides two different series of negative pulses, the first occurs near the zero degree phase point of the oscillator sine wave. This is transmitted toward the left, as shown in FIG. 4, the other output occurs near the 180° point of the input sine wave and is transmitted towards the right through the conductor designated READY PHASING GATE PULSES.

The zero degree negative pulse triggers a 20 microsecond multivibrator, designated 20μ SEC M.V. The multivibrator responsively generates a square positive pulse about 20 microseconds long and a corresponding negative pulse. The square positive pulse is used to set all of the stages in the transmitting shift register in the various control positions to the "zero" condition. It is explained that in the transmitting shift registers and in various other circuit units employed in the present system, the components of the register and corresponding units in the other circuits are all first set to the "zero" condition at the start of a unitary timed interval. They remain in this condition unless they are changed immediately after by the application of a so-called set "one" pulse. The set "zero" pulse is amplified in a cathode follower designated SET 0 CATH FOL in the upper middle portion of FIG. 2 and is then transmitted to the various positions through an individual amplifier, amplifier 1, of a group of amplifiers designated POS DIST AMPS shown at the upper left center in FIG. 2. From the output of this amplifier, the set 0 pulse is directed to each of the twelve stages in the twelve-stage transmitting shift register in each control position and sets each of the stages in the "zero" condition.

The trailing edge of the 20 microsecond positive pulse is first differentiated and the resultant negative pulse is applied to the set zero input S0 of the transmitting flip-flop circuit, designated TRANS FF shown at the upper left in FIG. 4. This negative pulse which sets the transmitting flip-flop circuit to "zero" occurs 20 microseconds after the multivibrator is triggered. The setting of the transmitting flip-flop circuit to "zero" may be considered as the beginning of each 200 microsecond time slot. However, it is seen more practical to consider the count pulse as starting a digitial element and the following matrix gate pulse as ending this element. To anticipate, it is pointed out that the signals, after passing through the transmitting shift register in the control position, pass through the transmitting flip-flop of their way to the radio transmitter.

The square negative pulse of 20 microseconds from the 20-microsecond multivibrator is passed through a 4-microsecond delay circuit, 4 M SEC DELAY and is differentiated. The negative pulse resulting from the differentiating process is eliminated in circuit 1B. The positive pulse is amplified and inverted in circuit 1B. Thus, a negative pulse is produced in the output of circuit 1B and it occurs 24 microseconds after the 20-microsecond multivibrator trigger or 4 microseconds after the beginning of a time slot. This negative pulse is applied through the conductor designated MATRIX GATE PULSE to the matrix gates designated MATRIX GATE 0-7, shown at the right in FIG. 4. To again anticipate, a seven-stage transmitting program counter designated XM PROGRAM COUNT 7 STAGE, which counts under control of the program and transmitting oscillator TRANS OSC, controls the program through a set of individual gates in the matrix gate circuit. The negative matrix gate pulse mentioned in the foregoing passes through each one of these gates at the proper time. There is one exception which should be noted. The matrix gate circuit includes arrangements for passing eight pulses during the first eight cycles of a frame which are instrumental in producing eight reversals of the "zero" and "one" conditions at the head end of each frame to serve as phasing signals. These signals are produced at double the normal signaling frequency in a manner to be explained hereinafter.

An amplifier, amplifier 1A, is connected to the output of the 4-microsecond delay circuit and serves to amplify counting pulses which are applied through the conductor PROGRAM COUNT PULSES to the transmitting and program counter. To agin anticipate, it is pointed out that the transmitting program counter is required to be reset after counting a frame. It is desirable to cancel the count pulse which would otherwise be transmitted to the transmitting program counter at the time the program counter is being reset. The condition which cancels the count which occurs at the time the program counter is being reset, is applied to amplifier 1A through the conductor designated CANCEL RESET COUNT. This will be made more clear hereinafter.

The program and transmitting counter and the matrix gates, which cooperate therewith, will now be described. The transmitting program counter is a binary counter with seven stages and can, therefore, assume 128 different counting permutations. In the present arrangement, it is not necessary to transmit 128 signals in a frame. The present arrangement counts only enough signal intervals to accommodate the signals actually in a frame and then recycles. If it is assumed, for instance, that the total number of signal elements required in a frame is 87, speaking in terms of the decimal equivalent of the binary number resetting in the counter, the counter starts at "zero", counts to 86, is caused to jump from count 86 to count 127 in a single interval by resetting all of the stages of the counter to the "one" condition, and then again runs through the same sequence. A number of count recognizing matrix gates are connected to the program counter stages. Each gate, under the control of the counter and of the matrix gate pulses heretofore mentioned, produces a negative pulse at its output only when the counter is in a particular one of its 128 possible conditions. The matrix gate circuit includes an individual gate which is enabled during count 85 and is connected through the individual pulse amplifier to a recycle circuit designated RECYCLE CCT, shown at the lower right in FIG. 4. The output of the recycle circuit is amplified in amplifier RESET PULSE AMP. This amplifier provides the pulse which resets the transmitting program counter. It also provides the pulse which controls the frame counter which counts the number of frames in a program. It also provides the so-called end-of-frame pulse, which is used to control a program counter in each position. It is particularly pointed out that an entire program comprises four frames as counted by the transmitting program counter. In order to control this program it is necessary that the frames be counted. This function is performed by the frame counter shown at the lower right in FIG. 4. The frame counter is operated by a pulse which passes through the matrix gate at the end of each program and thereafter through the reset pulse amplifier as heretofore mentioned. Since the directing of a frame of signals from a control position to the common multiplexing equipment and the reception of the return frame from an addressed plane is one a time basis, under control of the program and transmitting binary counter, the pulse which indicates the end of a frame is transmitted to a position program counter in each position to control the programming of the individual positions. This will be explained in more detail hereinafter.

Attention is now directed to the transmitting flip-flop circuit shown at the upper left in FIG. 4. The signal to be transmitted over the radio link is controlled by the transmitting flip-flop circuit. The transmitting flip-flop circuit is set to the "zero" condition near the beginning of each time slot by the negative pulses from a differentiating network, as mentioned in the foregoing. If a particular time slot is to be a "zero", no further action is taken. If a time slot is to be a "one", the set "one" input is triggered about 4 microseconds after the time of the set "zero". Consequently, a sequence of "ones" at the output of the transmitting flip-flop has a 4 microsecond "zero" condition at the beginning of each time slot. These intervals are so short compared to the time slot length of 200 microseconds that the low-pass filter LP FILTER in the connecting path to the radio modulator removes them.

The output of the transmitting flip-flop is fed to the modulator of the radio equipment via the low-pass filter and a cathode follower amplifier designated SIGNAL AMP XM. The cathode follower is provided with controls for adjusting the amplitude of the signal and the direct-current level, or bias, of the signal. The transmitting flip-flop is triggered to the "one" signaling condition under four conditions as follows. It is triggered to "one" in the middle of the first eight time slots at the head of a train to produce the so-called ready phasing signals. It is triggered to the "one" condition to product the start element which starts the oscillators at the outlying station. It is set to the "one" condition also when a "one" appears in the signal permutation for any of the words in a frame. It is set to the "one" condition also when a "one" signal condition is required as a parity signal. Attention is called to the fact that for three of these four conditions under which "ones" are set into transmitting flip-flop, the "one" condition is produced by the common multiplexing equipment. The "one" conditions appearing in the words, that is, in the address or in the intelligence or data which is transmitted from the control positions is, of course, produced in the control positions. This will be better understood from the following.

At the head end of each signal frame transmitted from the central control station to the outlying stations there is a group of so-called ready phasing signals. These signals are alternate "zero" and "one" signal conditions which are transmitted during the first eight cycles of a frame at twice the normal signaling frequency. In order to produce these signals the transmitting flip-flop circuit is first set to the "zero" signal condition and then in the middle of each signal time slot it is changed to the "one" signal condition for the first eight cycles. The negative 180° pulse produced in the oscillator squaring flip-flop circuit in FIG. 4 is passed through a matrix gate once during each of the first eight cycles to change the transmitting flip-flop circuit from the "zero" to the "one" condition to produce the ready phasing signals. The control inputs of the ready phasing gate in the matrix gate array are connected only to the four most significant stages of the program counter. These stages all remain in the "zero" condition for the first eight counts so that the gate is enabled for counts 0 through 7. The pulses of this gate pass through the conductor designated READY PHASING in FIG. 4 into FIG. 2 through a first diode and a capacitor and a second diode in the conductor and then are applied to set "one" input Sl of the transmitting flip-flop circuit at the upper left in FIG. 4. Each pulse arrives at the middle of the time slot during each of the first eight cycles and thus eight cycles of "zero" and "one" conditions at double the normal signaling frequency are produced and pass to the radio transmitter at the beginning of each signal frame. In the present arrangement after the eight double frequency reversals, the circuit remains quiescent during four normal signal intervals and then a "one" signaling condition of normal duration is transmitted as the start signal in each frame.

The manner in which the start signal is produced will now be described. It is to be understood that a matrix gate pulse is applied to the matrix gates during each time slot, but is permitted to pass only when the gates are properly conditions by the program counter. One of the components of the matrix gate array permits a pulse to pass when the counter has reached count 11, which is actually the twelfth time slot as counting starts at zero. This pulse passes through an individual pulse amplifier and then through an individual diode of the combining diodes and is applied to the conductor designated START AND PARITY PULSES. The start pulse produced at this count passes through transformer T1 in FIG. 2 and through an individual capacitor and diode, which constitutes a gate circuit for the start and parity set "one" signal conditions, to the set "one" input S1 of the transmitting flip-flop TRANS FF. The start and parity gate for the set "one" signal to the transmitting flip-flop for the start signal is enabled at this time by a "zero" condition of the transmitting parity counter. This will be made more clear hereinafter. As a result of the foregoing the eight double frequency reversals are followed by four "zero" conditions and then by a "one" signal condition for the oscillator start signal which starts the distant oscillators.

The address follows immediately after the start pulse in each signal frame. The same signal condition which serves to produce the start digit in each signal frame is passed simultaneously through the conductor designated READ-IN ADDRESS to the position circuits and is applied through amplifier 3 of the group of amplifiers designated POS DIST AMPS to a group of gates which control the transfer of the address, which has been set up on a group of contacts at the position, into the transmitting shift register in the position.

The manner in which the address pulses and the data pulses are generated will now be described. Following the start signal a group of twelve signal elements each of which may be a "zero" or a "one" to constitute a permutation defiing a particular outlying station which is being addressed are read simultaneously into the transmitting shift register. Each one of these elements in the address passes through an individual gate to the transmitting shift register. The read-in pulse for the address enables these gates and permits all of the elements of the address to be transmitted into the shift register simultaneously. Reference to the upper left-hand portion of FIG. 2 shows that read-in pulses for the address connect to but three stages. As will be explained later, the words are read in to the shift register in the same manner. In order to simplify the drawing only a few of these gates are shown in FIG. 2. It is to be understood, however, that the address and each of the words will have as many individual as are necessary to effect parallel read-in of the signal elements in each.

As will be explained hereinafter, the transfer of the information in the transmitting shift register through the transmitting flip-flop circuit to the radio transmitter is under control of an individual position transfer gate designated POS TRANS GATE in each position. This gate is shown at the upper left in FIG. 2. This gate is under control of the position program counter and is enabled to transfer information to the common multiplex equipment only when the position program counter has been properly conditioned under control of the common multiplex equipment. The signal elements of the address are transmitted out of the shift register, signal element by signal element, one in each time slot, and pass through the position transfer gate and through the contacts of an alarm circuit to the data transmitting amplifier DATA XM. The information in the transmitting shift register is moved progressively from stage to stage, in tandem, and passes out of the last stage of the register, one signal element at a time and is impressed on the transmitting flip-flop circuit. Each "one" condition signal element in the address or in any of the following words changes the transmitting flip-flop circuit to the "one" condition. A "zero" signal element in the address or in any word leaves the "zero" condition established in the transmitting flip-flop at the beginning of every signal element time slot undisturbed so the "zero" and "ones" pass out in the proper order to the radio transmitter.

It has been explained that a parity check digit is added as the last signal element of the address and as the last signal element of each of the words. In order to do this, the "one" condition signal elements in the address and in each of the words are counted. If the number of "ones" in the address or in any word is odd, the transmitting parity counter, show at the upper right in FIG. 2, disables the start and parity gate and prevents a signal element which would change the transmitting flip-flop to the "one" signaling conditions from passing the flip-flop. If, however, the number of "ones" in an address or in any word is even, the condition responsively produced in the transmitting parity counter permits a signal to pass, which changes the transmitting flip-flop to the "one" condition immediately after the address and each individual word has been transmitted. A matrix gate pulse is passes through the matrix gate array to effect the read-in of Word One from its encoding elements in a position to the transmitting shift register. This same pulse is directed through an individual combining diode and through transformer T1, in FIG. 2, to produce the proper parity digit depending upon the count of the parity counter and the condition off the start and parity gate. Each of the other words is read-in at the proper count and the matrix gate pulse, which effects its read-in. controls the addition of the proper parity count to the last preceding word.

Each pulse from the matrix gates which passes through the combining diodes to insert a start signal or to add a "one" to a group of signal elements as a parity checking element, performs another function. It resets the transmitting parity counter to the "zero" condition if it is in the "one" condition. The parity counter is thus made ready to count the "ones" of the next group of elements received from a control position. When the parity digit for the last word in a frame is generated, the parity counter is set to "zero" as before. Therefore, the counter will be in the proper condition to permit the insertion of the "one" start digit and for a parity count of the address in the next message frame.

It has been explained that the surface terminal of the data multiplex system transmits for two frames and then is placed in a receiving condition for two frames. The transmitter must, therefore, be switched for the "two-on-two-off" sequence. This is accomplished by the two-stage binary counter designated FRAME COUNTER in the lower righthand portion of FIG. 4. This counter is driven by a positive pule from transformer T5 which is produced, as mentioned heretofore, at the end of each frame. The output of the most significant counter stage of the frame counter is impressed on he CARRIER KEYING tube. This changes the condition of the radio transmitter turning it on and off every two frames.

The order in which the control positions are permitted to transmit is controlled by the position sequence control circuitry. This essentially comprises two gas stepping tubes designated UNITS COUNTER and TENS COUNTER, shown at the lower left in FIG. 4. Each tube has ten output cathodes and each set of two tubes can control 100 positions. There will be as many sets of tubes as required for the total number of positions served. The dischargein the units counter tube is stepped from cathode to acathode by the output of a stage of the transmitting program counter through the conductor designated SEQUENCE COUNT PULSES. This stage is the second last significant stage and operates at the rate of 1,250 cycles per second. A square wave from this stage is passed through the step pulse amplifier STEP PULSE AMP, shown in the right middle portion of FIG. 2, and then through the units driver tube for the units counter, shown in the lower right in FIG. 1, and then drives the UNITS COUNTER tube. A positive pulse from the ninth cathode of the units counter tube triggers the tens advance flip-flop tube TENS ADVANCE FF so that its plates swing positive. This in turn changes the grid bias of the tens driver tube so that the next positive pulse, the tenth pulse, will make the tens driver tube TENS DRIVER conduct. The tenth pulse, therefore, will pass through the tens driver tube and will step tube TENS COUNTER one step. When the units counter discharge advances from the ninth cathode to the zero cathode, the pulse output at the zero cathode triggers the grid of the tens advance flip-flop and the tens driver is again cut off. Thus, the tens counter is stepped once for each ten steps of the units counter. The stop-stepping tube, shown in the lower right of FIG. 2, functions to arrest the stepping of the discharge in both the units and tens counter when a position has been found ready to transmit. This will be explained in more detail hereinafter.

For each control position there is a position start gate shown in the lower middle portion of FIG. 2. This gate is enabled by a near zero voltage condition on three control leads. One of these leads connects to an individually assigned cathode, for each position control circuit, in the units counter and the other to an assigned ccathode in the tens counter. When a discharge impinges simultaneously on each of these cathoder, the particular position controlled thereby may be selected if it is ready to transmit. The third control lead to the position start gate connects to the corresponding individual position through the condi ctor designated POS READY. A proper condition to enable the gate is passed through the position ready conductor when the position is ready to transmit. When all three control conditions are met, the terminal designated POINT X swings positive. This causes the stop-stepping tube, STOP-STEPPING, to conduct. This in turn arrests the stepping action in the counter tubes leaving the discharges resting on the cathodes which enable the gate.

The positive swing of POINT X also enables a diode gate Y, the input of which is fed from the position start amplifier POS START AMP, shown at the lower right in FIG. 4. The pulse input to the position start amplifier is received from one of the matrix gates through an individual pulse amplifier PULSE AMP G and the transmit receive gate TRANS REC GATE. This pulse occurs at count 3 of the transmitting program counter during the interval when the transmit receive gate is enabled by the transmit condition of the FRAME COUNTER. The output pulse from the position start gate is used to prepare the position data multiplex from which the message is to originate, that is, the control position corresponding to the positions in which the gas stepping units and tens counter tubes are arrested.

Each position has a connection through its individual start gate to the grid of the stop-stepping tube for interrupting the stepping of the units and tens counter tubes when a position is found ready to transmit. As soon as the position start pulse reaches the position data multiplex, it sets up a transmit condition in the particular position. This permits the data from the transmitting shift register in the selected position to control the transmitting flip-flop in the common multiplex equipment and removes the ready condition in the counting and selecting circuit to permit the stepping tubes to hunt for the next control position in the sequence which is ready to transmit.

The position data multiplex circuits will now be described. The position program control circuit is shown at the lower left in FIG. 2. This circuit controls the gates which connect the position data multiplex to the common transmitting and receiving portions of the surface terminal. It also controls the rate of access of each position to the common part of the system.

An end-of-frame pulse produced at the end of each frame in the transformer T5 shown at the lower right in FIG. 4 is passed through a conductor designated END FRAME PULSE and through an amplifier therein to a pulsing circuit designated PULSE CCT which serves responsively to produce two shift pulses, one a set "zero" pulse and the other a set "one" pulse. These pulses are applied to a position program counter shown at the lower left in FIG. 2. The position program counter has three stages. Initially all stages are in the "zero" condition. This is designated the 0-0-0 condition of the position program counter. The position program counter starts with all three stages at "zero" and continues in this condition regardless of the shift pulses until a position start pulse puts a "one" in the first stage. The position start pulse, as explained, is received through the position start gate and is applied to the left-hand unit 35C of the position program counter.

While each one of the three stages of the position program counter is in the "zero" condition, tubes V233 and V234 are cut off by the negative potential of their grids. Tube V233 being cut off, restores full anode voltage to gas triode V235. Tube V234 being cut off, permits the entry timer capacitor C236 to charge to a positive potential from ground. The positive potential is supplied through variable resistor R237 and the two units, resistor R237 and capacitor C236, which is a variable capacitor, constitutes a variable timer which controls the duration of the waiting period which exists between the times the control position obtains access to the common multiplex equipment. After a period depending upon the setting of the variable capacitor C236 and the variable resistor R237, the gas triode V235 triggers and the voltage at its cathode rises from negative 14 volts, for instance, to about 0 volts. This voltage swing is applied through conductor POS READY and a contact in the ALARM DISCONNECT circuit on the position start gate and constitutes the position ready signal. As the sequence stepping tubes of the units and tens counter step to the cathodes assigned to the particular position, the position start gate individual to the position is enabled.

As the position start gate is enabled, the negative position start pulse from the position start amplifier puts a "one" condition in the first stage 35C of the position program counter. This is called the 1-0-0 condition of the counter. When in the 1-0-0 condition, the position program counter enables the position transmitting gate POS TRANS GATE and so provides a connection from the transmitting shift register in the connected control position to the transmitting flip-flop TRANS FF in the common multiplex equipment. Diodes C238, C239, and C240 which are each responsive to the condition of an individual stage of the three-stage position program counter, cause tubes V233 and V234 to conduct as long as any one of the three stages is in the "one" condition. While any one of these three stages is in the "one" condition, a positive potential is applied through its respective diode to the grids of tubes V233 and V234 causing both to conduct at such times. When tube V234 conducts, it discharges the capacitance of the entry timer. When tube V233 conducts, it extinguishes tube V235. With tube V235 extinguished, the position ready signal is removed and the counting tubes in the position selector circuit start stepping immediately in search of another position which is ready to transmit. The selected position remains connected to the common multiplexing equipment and the information data in the form of five words is read into the position transmitting shift register and is shifted out as described heretofore to the radio transmitter during the remainder of this first frame.

At the next end of frame pulse, the "one" condition is shifted to the second stage of the position program counter. This is known as the 0-1-0 condition of the counter. This is the interval during which another position is transmitting or a reply to another position is being received. The entry timer cannot be charged at this time as tube V234 is maintained conducting due to the "one" condition of the middle stage 35B of the position program counter. The "zero" in the first stage of the position program counter applies an inhibiting condition on the position transmitting gate POS TRAN GATE during this frame.

At the end of the succeeding frame in response to the end-of-frame pulse, the "one" is shifted to the third stage of the counter 35A. This is known as the 0-0-1 condition of the position program counter. When the position program counter is in the 0-0-1 condition, it impresses a positive potential through the conductor designated READ OUT ENABLE from FIG. 2 through FIG. 3 and into FIG. 5 where it is applied to the position receive gates 591 through 595. This condition enables the position receive gates and permits and data accumulated in the receiving shift register to be read out of the storage circuits. This will be explained more fully hereinafter. The "one" condition in the third stage of the position program counter maintains tube V234 activated and maintains the entry timer in a discharge condition.

At the next end-of-frame pulse the position program counter is set back to the 0-0-0 condition and the cycle is ready to repeat.

Attention is particularly directed at this time to the entry timer, variable capacitance C236 and variable resistor R237, and to its control tube V234. It should be noted that, as explained heretofore, while any of the position program counter stages is in the "one" condition, tube V234 will be activated and capacitance C236 in the entry timer will be discharged. The only time when tube V234 is not activated, is while the position program counter is in the 0-0-0 condition. This is during the interval while a position is waiting to be connected to the common multiplex equipment. The train of events which effect connection of a position to the common multiplex equipment cannot start until the capacitance C236 in the entry timer starts to charge. It was mentioned that the resistor R237 and the capacitor C236 are variable. In accordance with the present invention the entry timer has been changed through new circuitry to be explained hereinafter so that it provides great flexibility to provide the readdress feature of the present invention.

Attention is also especially directed to tube V232. Tube V233 is activated whenever any of the stages of the position program counter is in the "one" condition. It will be unactivated, therefore, only during the 0-0-0 interval, that is, while a position is waiting to obtain access to the multiplex equipment. At such times tube V232 will be activated under control of tube V233. When a reply is not received from an addressed plane tube V232 is employed as one of the controls which connect a position to the common multiplex equipment during the waiting interval at a rate which is very much faster than the usual rate of connection. This will be described more fully hereinafter, when the readdress circuit of the present invention is described in detail.

The more important events in the transmitting cycle at any given control position, which have been described in the foregoing, will now be summarized in the sequence in which they occur.

Assume that the position program counter at any position is in the receiving condition during which a frame of signals is incoming from its individual plane or outlying station. In this condition, the two left-hand counting stages of the position program counting circuit are in the zero condition and the right-hand stage is in the one condition. In other words, the counter is in the 0-0-1 condition.

The position program counter is next shifted to the 0-0-0 condition by the end-of-frame pulse from the matrix gates in the transmitting portion of the common multiplex circuit. That is to say, each stage of the position program counter will now be in the zero condition.

Then, the first event which will start the transmitting cycle at any control position is the position-ready signal from that particular position. When the counter reaches the 0-0-0 condition at the particular position, the entry timer circuit is started by the charging of the capacitor C236 in the entry timer circuit. As explained heretofore, the amount of this capacitance is variable. Control is effected by means of a message rate switch at the control position. After a period, depending upon the setting of the message rate switch, the rise in potential of the cathode of gas tube V235 to about zero potential provides the position-ready signal to enable an individual branch of the position start gate.

When the units and tens counters, stepping every fourth count of the program and transmitting oscillator TRANS OSC in the common multiplex equipment, reach the individual cathodes assigned to the position which is about to transmit, the individual gate in the units and tens counter in the common multiplex equipment enables the corresponding gates in the position-start circuit and this combined with the position-ready condition enables the position-start gate.

The enabling of the position-start gate causes point X in the gate to swing to the positive condition which, in turn, causes the stop-stepping tube in the common multiplex circuit to conduct and stops the stepping of the counter circuit which is thus arrested on the cathodes individual to the position which is attempting to conduct.

The enabling of the position-start gate also allows a position start pulse to pass from a particular transmitting matrix gate in the common multiplex equipment and through the position-start gate pulse amplifier to set a one condition in the left-hand stage of the position program counter, thus setting the position program counter in the 1-0-0 condition.

When the position program counter is in the 1-0-0 condition, the position transmitting gate POS TRANS GATE through which the transmitting shift register, in the individual position which is about to transmit, and transmission equipment, in the common multiplex equipment, are interconnected, is enabled. The read-in pulses passing through the transmitting matrix gates in the common multiplex equipment at the proper counts read the data which has been set up at the individual positions into the transmitting shift register thereat. The shift register "set O" and "set 1" pulse move the data along from stage to stage in the transmitting shift register and each signal element appearing in the final stage of the shift register at the position is impressed on the transmitting flip-flop circuit and passes to the radio transmitter.

The entry timer circuit is prevented from charging by the "one" condition in the left-hand stage of the position program counter. The position-ready signal which has been applied to the units and tens counters in the common multiplex equipment is erased when the entry timer capacitance is discharged and the discharge in the units and tens counter again starts stepping to locate a new control position which is ready to transmit, so that the new position may be connected to the common multiplex without delay, at the proper time.

At the end of the transmitting frame, the end-of-frame pulse from a matrix gate in the common multiplexing equipment shifts the position program counter, in the position which is presently connected to the common multiplex, to the 0-1-0 condition. In this condition the middle stage of the position program counter is conducting. During this frame, the entry timer capacitance C236 is prevented from charging, by the one condition is the second stage of the position program counter. The position transmitting gate POS TRANS GATE is inhibited during this frame.

At the end of the frame intervening between transmitting and receiving at a particular position, the position program counter is shifted by an end-of-frame pulse, through the transmitting matrix gate in the common multiplex equipment, to the 0-0-1 condition. This is the receiving condition. The position program counter, when in the 0-0-1 condition, impresses a condition on the receiving gates such as 591 through 595 in the position. Data accumulated in the receiving shift register is read out to storage.

Again, the capacitance in the entry timer is prevented from charging by the "one" condition in the third stage of the position program counter.

During this time, the position transmitting gate remains inhibited.

The end-of-frame pulse from the transmitting matrix gates in the common multiplex equipment shifts the position program counter to a 0-0-0 condition to mark the start of a new cycle.

Attention is called to the fact that the read-in pulses for the various words are applied from the transmitting matrix gates in the common multiplex equipment to the read-in gates at each position during each frame. The data in each transmitting shift register is stepped along to the final stage, one signal element at a time, as a frame is counted. However, it is also pointed out that the position transmitting gate intermediate the transmitting shift register at each position and the common multiplexing equipment is enabled only during the transmitting frame of any four-frame cycle in which the particular connected position has obtained access to the common transmitting multiplex equipment.

A number of functions of the improved circuit of the present invention will now be described.

The present circuit includes an access indicator. The access indicator tube V232, shown at the left-middle portion of FIG. 2, in the position program control circuit conducts, as explained, during the time a particular position is waiting to have access to the common portion of the data multiplex system. During this interval, current in the output circuit of tube V232 flashes a neon lamp each time the control position is connected to the common equipment. This signal is also used with the readdress feature to be described more fully hereinafter.

Another feature is a no-reply indicator. This circuit functions to provide an indication when no reply is received from an addressed aircraft or outlying station.

At count 3 in every frame, as counted by the transmitting program counter in the common data multiplex equipment, a pulse is transmitted through a matrix gate over a conductor designated NO-REPLY CCT RESET PULSE, shown at the lower right in FIG. 4, which is passed to the no-reply circuit, shown at the upper right in FIG. 5. This pulse is applied during every frame. During the receiving frame, in every four frames, a condition is applied, as explained, from the position program counter through the READ OUT ENABLE conductor to the receiving gates 591 through 595 which controls the transfer of the received information into the storage circuits. This same condition is applied through resistor R501 on the position receive gate POS REC GATE in FIG. 5. During the receiving frame interval, these two conditions, cooperatively applied to the position receive gate permit a pulse to pass to the no-reply circuit in FIG. 5 and set the no-reply bit circuit, NO-REPLY BIT, to the "one" condition. If a signal frame is actually received from the individual plane associated with a particular position which is in condition to receive, the start signal in the frame will be applied, in a manner to be explained, through transformer T30 in FIG. 3 and impressed through the conductor designated REPLY START, pulse amplifier 596, the REPLY START GATE, pulse amplifier 599, and amplifier SET 0 AMP on the NO-REPLY BIT circuit. This will restore the no-reply bit circuit to the "zero" condition. As long as the replies are regularly received, relay K2, shown at the upper right in FIG. 5, is not permitted to operate. If, however, a reply is not received, relay K2 is operated, in turn lighting the no-reply lamp as an indication that no reply has been received.

The automatic readdress circuit shown in detail in FIG. 7 is under control of switches therein. When the no-reply bit circuit is left in the "one" condition due to the absence of a reply, the readdress circuit provides means for shortening the time constant of the entry timer, so that the position will be ready to transmit to an aircraft again in the shortest possible time. The access indicator tube V232, FIG. 2, and the no-reply bit circuit, FIG. 5, are connected to the counting circuit in FIG. 7 which counts the number of times the nonreplying aircraft is readdressed. The no-reply bit circuit initiates the counting, whereas the access indicator provides the counting input.

The change in the interval during which a position is required to wait before regaining access to the common multiplex equipment is under control of the entry timer. This timer, as explained, may be adjusted for various intervals. The adjusting of the intervals changes the frequency with which a waiting condition is applied to the selecting elements individual to a position in the units and tens counter. This permits a waiting position to be selected at normal or shortened intervals. The readdress circuit includes means also for automatically establishing the number of times a particular aircraft may be readdressed. If a reply is received when an aircraft is first readdressed, the readdress circuit switches back to the normal rate of addressing. If no reply is received after a predetermined number of attempts, the readdress circuit reverts back to the normal readdress rate automatically. If no reply is received to the following transmission at normal address rate, the readdress circuit again comes into play, reoperating at the faster rate.

The manner in which the airborne or outlying station circuitry functions is described in detail in the patent identified in the foregoing. Since it does not function in any different manner in cooperation with the improved circuit of the present invention, it is considered that a description of it is unnecessary to an understanding of the present invention. It will be mentioned, however, that in response to a signal frame transmitted from the central control station the preliminary signals including the phasing, ready and start signals are received by all planes or outlying stations. In response to this, a programming oscillator and binary counter are started in all stations and remain in operation in all stations until the address has been received and compared with an assigned address. Thereafter the plane having an address corresponding to the received address receives the words or intelligence in the received frame while the circuitry in all other planes is restored to the quiescent condition.

The addressed plane passes the signal elements of the first word into a shift register and thereafter transfers it to a storage circuit for the first word if a parity check applied by the addressed plane to the first word is met. Each succeeding word in the message is similarly processed until all have been transferred into an individual storage circuit for each word. If a parity check for a particular word is not met, the word is not transferred to storage and the information last received remains in the storage of the particular word which failed to meet the new parity check.

At the end of the frame is which the addressed plane receives its message, the program binary counter in the plane is reset and counts a number of signal intervals equal to the number in a second frame. During this interval, the combined transmitter-receiver in the addressed plane is switched to the transmitting condition. Information which has been set up in the addressed plane or outlying station is then transferred under control of the oscillator and transmitting matrix gates in the addressed plane to a shift register therein, each word in turn passed to the radio equipment which transmits it to the central control station.

A signal frame transmitted from an addressed plane to the central control station resembles one transmitted in the opposite direction to the plane except that it does not include a group of elements defining an address. At the head end of the train, the preliminary group of signals comprising the phasing, ready and start signal elements have the same format as the corresponding group transmitted to the addressed plane. Following this, five permutations of groups of signal elements, each defining a word which generally is an item of data, are transmitted. Each word has a parity check element added as the last element of the word to make the number of 1 condition elements in each word odd. When the plane or outlying station has transmitted the last signal element of a frame to the control station, it resets its binary counter and stops its oscillator to prepare for the reception of a new frame.

It was mentioned in the foregoing that the address is omitted in the reply sent to the surface terminal. This ensures that there is sufficient time in the message frame interval of the surface terminal to allow for a round-trip radio propagation time which may be, for instance, 2.7 microseconds.

After passing through the radio receiver at the surface terminal the FM radio signal passes through the conductor designated RECEIVED SIGNAL FROM RADIO shown at the upper left in FIG. 3. The received signal has a voltage swing of about 5 volts, peak-to-peak, and is normally centered at about 0 volts, but this varies with the frequency variations in the transmitter and the receiver.

The incoming signal is first passed through low-pass filter LP320 which attenuates the noise level above the 5 kilocycle "ready-phasing" frequency which is the maximum fundamental contained in the message. The signal is then passed through the signal gain potentiometer SIG GAIN and impressed on the signal amplifier tube SIGNAL AMP. It is then impressed on three individual channels, CHANNEL 1, CHANNEL 2 and CHANNEL 3. The function of these channels is to separate the ready-phasing information from the rest of the signal and to positively identify the following start signal as being the one immediately preceding the first signal element of an incoming word. In channel 1, the incoming frame first encounters a low-pass filter LP323 which prevents the preliminary signals from passing because of their higher frequency but does pass the single start signal element and the permutations comprising the words which are at the normal frequency rate. This filtering further attenuates the noise in channel 1 which is the data channel and the channel through which the start signal is passed. After passing through the low-pass filter the signals are impressed through capacitor C35 on the grid of a cathode follower tube 341. Definite direct-current levels for the two-valued signals are established at this point by the biased crystal diodes 324 nd 325. These levels, for instance, may be +9 volts for a "one" and −35 volts for a "zero". One diode conducts if the signal on the grid of cathode follower 341 becomes more positive than +9 volts. The other diode conducts if the signal becomes more negative than −35 volts. When the diodes conduct, capacitor C35 changes its charge so as to keep the signal centered between these two direct-current potentials. The output from the low-pass filter is adjusted to have a swing of about 44 volts so that diodes need to conduct only to restore the proper direct-current levels to the signal. The output from cathode follower 341 is applied to the slicing tube 342 which responds only to a narrow range of input voltage. Diodes 343 and 344 in the plate circuit of slicer tube 342 limit the signal swing between ground and approximately 15 volts, for instance. The output of slicer tube 342 is essentially a square wave corresponding to a narrow horizontal slice through the signal from the cathode follower 341. The slicing level potentiometer SL POT provides adjustment of the position of the slice on the signal and is normally set to be halfway between the steady state "one" and "zero" conditions. A direct-current signal without varying signal bias due to frequency drift is thus obtained to feed the digital circuits.

The manner in which the start-stop receiving oscillator ST-SPOSC 345 is synchronized will now be explained. Part of the output from the plate circuit of signal amplifier tube 346, at the upper left in FIG. 3, is impressed on channel 2, first through a network PHASE NET where it is attenuated and advanced in phase. It is then impressed on a phasing gain potentiometer PHASE GAIN 348 which provides a level adjustment. The resulting signal is amplified by the phasing pattern amplifier 349 and passed through a phasing band-pass filter 350. This filter accepts the ready-phasing portion of the synchronizing pattern and is narrow enough so that it requires the entire 8 cycles of the signal to reach steady state.

The low impedance output of filter 350 connects to the base of a transistor in squaring flip-flop 351. The squaring flip-flop produces an approximate square wave from the sinusoidal output of the filter. The negative transition of the square wave triggers transistor amplifier 352. A negative pulse is thus obtained from amplifier 352 at the center of each incoming digit interval, after the filter output has built up sufficiently. The base of a transistor in squaring flip-flop 351 is biased positively, so that the output from the filter must reach a certain value before any output is obtained. The input to amplifier 349 is adjusted so that normally about 8 pulses are produced by amplifier 352 from the ready-phasing signal. Due to the delay, in the passage of the ready-phasing signals through the filter, the series of 8 pulses from amplifier 352 straddles the position of the incoming start digit as the start digit passes through channel 1.

The output from the plate of signal amplifier tube 346 is passed also through the ready gain potentiometer in channel 3 and is amplified in tube 373. It is then applied to the tuned circuit 374 of the ready detector 375. Channel 3 has a tuned transformer which responds to the 8 cycles of the "ready-phasing" signal. The full-wave bridge rectifier 375 provides a positive voltage to the grid of ready amplifier READY AMP 376. This voltage builds up before the pulses from pulse amplifier 352 in channel 2 start and dies away before they cease.

The phasing pulses are applied to the start gate 377. This gate is enabled by a "one" condition of the restored data signal through conductor 311 and is inhibited by a negative swing, either from amplifier 376, as a result of the ready signal, or from the start-stop timer 378, as a result of the start-stop flip-flop being in the "start" condition. This will be explained hereinafter. Normally this results in an output pulse from channel 2 which occurs at the center of the incoming negative "start" digit in channel 1. The output of amplifier 376 also clamps the input of the cathode follower 341 in channel 1 at negative 35 volts, by way of an isolating diode 380. The clamping assures that the "zero" condition of the incoming signal, just prior to the "start" digit, will be set at the proper value of negative 35 volts, regardless of the directcurrent level of any previous message.

The receiving start-stop oscillator at the central control station and the generation of the timing pulses will now be described. The recognition of the "start" digit as described above causes the receiving program to start. The negative output pulse of the start gate triggers the start pulse driver 382. The positive output pulse from the start pulse driver 382 drives start pulse amplifier 383. A low impedance negative pulse is obtained from the secondary winding of transformer T30. This pulse is applied through conductor PROGRAM RESET to set all of the stages M1 through M6 of the receiving program counter 505 in FIG. 5 to the "one" condition. The plate output of amplifier 383 triggers the start-stop timer 378 to the "start" condition. The start-stop timer 378 is a monostable circuit with a relatively long period. A negative swing from the output of the start-stop timer 378 inhibits the start gate while the receiving program is running. The negative swing in the output of start-stop timer 378 also cuts off oscillator stop tube 386. This interrupts the stop current flow in the tuned circuit 387 of start-stop oscillator 345. This causes the start-stop oscillator 345 to start with the voltage at the cathode at the 0° of a sine wave. The oscillator squaring flip-flop 507, which follows, is triggered by the oscillator wave. The negative-going transitions from the oscillator squaring flip-flop 507 which occur at the 0° phase of the oscillator cycle occur at the centers of the incoming digit intervals. These negative-going transitions are differentiated and the resultant pulses are used to trigger the monostable 20-microsecond multivibrator 529. These differentiated pulses are also applied through transformer 566 and conductor 510 to the receiving matrix gates 511. They are also applied through conductors 508 and 509 to the set 0 input of the sampling flip-flop 379, FIG. 3, to set it in the 0 condition. They are applied also through transformer 512 and pulse amplifier 513 to pulse generator circuit 514. In response to these pulses the pulse generator circuit 514 produces the set 0 and the set 1 pulses for the receiving shift register 515. The output of multivibrator 529 is delayed 4 microseconds in delay circuit 515. It is then differentiated and the resultant pulses applied to the grids of amplifiers 517 and 518. The negative pulse resulting from the differentiating process is eliminated in diode 519. The positive pulse is amplified and inverted in amplifier 517. The negative pulses from the plate of amplifier 517 are differentiated to result in both positive and negative pulses. The negative pulses are applied to the receiving sample gate 393, FIG. 3, through conductor 521. Amplifier 518 amplifies the delayed pulses and applied them through the count pulse conductor 531 to the input of the receiving program counter 505. This serves as the count pulse which controls counter 505.

The manner in which the received data is sampled and accumulated will now be described. The restored data signal in channel 1 and the negative pulses from pulse amplifier 517 are impressed on the receiving sample gate 393 in the upper middle portion of FIG. 3. When this gate is enabled by the "ground" condition of the output of slicer tube 342, which corresponds to a "one" data digit, a pulse from amplifier 517 passes through the receiving sample gate 393 and sets the sampling flip-flop 379 to the "one" condition. A "set 0" pulse from the oscillator squaring flip-flop 507 resets the sampling flip-flop 379 to 0 24 microseconds before each data sampling from amplifier 517.

In this way, each incoming digit interval is sampled near its center and the result placed in the sampling flip-flop 379. At the same time, the information previously stored in the sampling flip-flop is passed through cathode follower 541, FIG. 5, and distributed to the control positions. The incoming data signals are shifted into an individual receiving shift register such as register 515 at each control position element by element. It is to be understood that this receiving shift register at each position has an individual stage for each signal element in a word in the received frame. That is to say, it can store a single code combination defining one item of data in its entirety. The shift register in the various control positions thus accumulates the incoming data intended for each when it is connected to the receiving equipment in the common data multiplex.

The receiving parity counter will now be described. The receiving parity counter 532 is used to count the "ones" as they pass through the sampling flip-flop 379. The receiving parity count pulses, that is the pulses which control the stepping of the receiving parity counter 532 are produced in the oscillator squaring flip-flop 507 and are applied to the receiving parity counter 532 through the receiving parity gate and conductor 534. These pulses are produced at a time about half-way between the data sampling instants. A "one" condition of the sampling flip-flop circuit enables the receiving parity count gate 534 and a pulse is thereby passed to the receiving parity counter 532. Thus, the receiving parity counter changes state each time a "one" is received in the sampling flip-flop 379. Since all of the word groups as transmitted from an aircraft or outlying station have an odd number of "one" digits, the final state of the receiving parity counter after counting the "ones" in each word should be a "one". It is pointed out that the counter is initially set to the "zero" condition by the word read-out pulses from the pulse amplifiers which are passed through diodes 551 through 555 and transformer 556 to reset the parity counter to "zero" before each word received.

The manner in which the reading-out pulses are generated and the data is stored will now be described. Positive pulses from cathode follower 518 are used to drive the 6-stage receiving program counter 505. The individual stages of counter 505 are designated M1 through M6. Negative pulses from the oscillator squaring flip-flop 507 are applied to the matrix gates 511 through conductor 510 for count recognition. These matrix gates are connected to the receiving program counter 505 in such manner that they are enabled at the proper counts to read the information stored in the receiving shift register 515 into an individual storage array for each word. The matrix gates are enabled approximately one time slot after the twelfth digit of a word group has been received and about one-half a time slot after it has been counted by the receiving parity counter. The outputs of each matrix gate triggers an individual pulse amplifier of the group 561 through 565 for each word read out. Positive pulses are gated by the read-out control gates 571 through 575. They are then amplified by the read-out pulse amplifiers 581 through 585. The output of read-out pulse amplifiers 581 through 585 are connected in common to a plurality of station control circuits. In each of these the output from the pulse amplifiers 581 through 585 is applied to an individual diode such as diode 591 through 595. These diodes serve as readout control gates. The gates are enabled during the 0-0-1 condition of the position program counter as mentioned in the foregoing. The read-out pulses are inhibited by a "zero" condition of the parity counter 532 resulting from an even count of "ones." Since only an odd number of "ones" are transmitted, an even count indicates an error in transmission, and the erroneous data is not read out into storage. At each read-out time, the parity counter is reset to the "zero" condition, as explained, to be prepared to count the "ones" of the next word group. The storage circuits include means, not shown, to report the result of the parity count and thus give an indication when erroneous data is received and discarded. At the beginning of the message, the pulse from start pulse amplifier 383 is further amplified by position distributing amplifier 596 through conductor 597. This pulse then triggers the "set 1" input to the 5 parity check storage bits in the storage circuit. These pulse generator circuits are located in the position data multiplex. The bit circuits are subsequently returned to "zero" by the read-out pulses. Failure to obtain an odd count of "ones" in any word results in no read-out and the parity check circuit for that word is left in the "one" condition until the next message is received.

The end of the receiving program will now be explained. The occurrence of the last read-out pulse triggers the start-stop timer 38 back to the stop condition. A positive pulse thereby produced in applied to the grid of the oscillator stop tube 386 causing it to conduct. The condition in oscillator stop tube 386 stops start-stop oscillator 345. This, in turn, stops the receiving program counter until the reception of another synchronizing pattern recycles the program. If, for some reason, the program counter should not reach the designated final count, monostable circuit 378 reverts to the "stop" condition and stops the oscillator.

Refer now to FIG. 7 which shows the readdress circuit of the present invention.

First, generally, the function of the readdress circuit, as mentioned heretofore, is to readdress an aircraft or outlying station in the event that no reply has been received from it after it has been addressed. After the failure has been recognized, the operator at the control position actuates the readdress switch 1 and the timing switch 2, both in FIG. 7. Switch 1 controls the number of times that the airplane or outlying station is readdressed. Switch 2 is adjustable to nine different positions to afford nine different intervals of entry timing. When a reply has not be received, the switch 2 is set to its ninth position which affords the shortest interval in delay of reentry or the maximum rate at which a position may gain access to the common equipment in the data multiplex. By means of switch 1, a plane or outlying station may be readdressed once, twice, or three times.

As explained in the foregoing, the discrete address system is arranged to transmit to two aircraft and then to receive the replies from these two aircraft in sequence. Then two more aircraft are addressed and their replies received. This, as explained, is done to allow the aircraft combined ratio transmitter-receiver sufficient time to be switched from the receiving to the transmitting condition. Thus for any control position at the switching center, the sequence of operation is transmit-pause-receive-wait-transmit-pause and so forth. The pause frame may be either the transmit or receive frame of another control position. Each transmit, pause or receiver frame may be 17.4 milliseconds long, for instance. The duration of the wait interval or frame depends upon the setting of the address rate switch 2. This controls the RC constant of a timing circuit in the data multiplex equipment and the system load. The minimum wait frame duration is 17.4 milliseconds and the maximum is eight seconds. When the readdress operation has been selected the desired circuit action is as follows. Whenever a reply is received, no action should be taken. If a reply is not received, an indication should be given to try again, one, two, or three times at the option of the operator, at the control position to determine if it is possible to receive a reply. If a reply is received the circuits should be restored to normal.

Readdress control is achieved through two data multiplex circuits as follows:

(1) A no-reply bit storage circuit, shown at the upper right in FIG. 5, which, as explained, is turned to the on condition at the beginning of each receive frame and is turned off as soon as the reply is received. If no reply is received, the circuit is not turned off and remains in the on condition until a reply is received.

(2) A vacuum tube, tube V232, shown at the left in FIG. 2, which is cut off, as explained, during the transmit-pause-receive portion, but conducting during the wait portion of the four frame program of its associated position.

The logic of the readdress circuit based upon the transmit-pause-receiver-wait sequence of a position. If a no-reply indication is present, the wait periods are counted. During certain preselected counts, depending upon the desired number of readdress attempts to be made, the address rate switch 2 in FIG. 7, is effectively turned to the maximum address rate. It has been explained in the foregoing that when no-reply is received, relay K2, shown at the upper right in FIG. 5, is operated. This relay is indicated also in the lower left-hand portion of FIG. 7 as is the no-reply lamp associated therewith. The no-reply lamp is normally in the lighted condition. It is extinguished when no reply is received as an indication thereof when relay K2 operates. Relay K2 provides the voltage for the counter circuit of FIG. 7. When relay K2 is operated, vacuum tube V232 which, as explained, is activated during every wait period, draws current through relay K1 operating relay K1 once during each waiting period. Relay K1 provides the counter circuit of FIG. 7 with a ground pulse for each waiting period. The readdress selector switch SWITCH, however, prevents relay K1 from supplying a ground pulse to the counter circuit when the readdress function is not desired. In describing the entry timer, capacitance C236 and resistor R237 were said to be variable. In FIG. 7 the variable capacitor C236 is represented by the capacitors CS3, CS4, CS5 and CS6 and the variable resistor R237 by resistors R1, R3 and R4 which are shifted operatively into circuit through the operation of SWITCH 2 and the relays in FIG. 7 in a manner to be described hereinafter.

The circuit of FIG. 7 is a recycling counter circuit which uses a total of eight relays connected as prime counters operated in sequence. The circuit is characterized by flexibility which allows changing the number of readdress attempts to be made with a minimum of switching. The circuit is arranged to recycle, as will be made clear hereinafter, however, it will not recycle with less than three stages.

When it is desired to readdress once, the counter circuit is arranged by switch 1 as a four-stage counter.

Relays K11 and K10, K21 and K20, K31 and K30 and K41 and K40 are arranged in pairs to provide a single counting stage each. When the counter is arranged to readdress once, the low RC value of the data multiplex timer is presented to the data multiplex on the first and third counts, corresponding to the first and third wait periods. SWITCH 2, as explained, is arranged to establish different RC values for its different settings on the even counts of the counter of FIG. 7. By this is meant that, during wait periods 2 and 4, the RC value which is presented to the multiplex depends upon the particular setting of the switch.

In order to readdress twice, the counter circuit is arranged as a three-stage counter presenting the low RC value during the first and second wait periods and the value established on message rate SWITCH 2 during the third waiting period. During the fourth wail period, the counter is recycled.

When the readdress circuit is switched to readdress three times, the counter circuit is again arranged as a four-stage counter. However, at this time the low RC value is presented to the multiplex during the first, second and third wait periods. During the fourth wait period the RC value selected by message rate SWITCH 2 is presented to the timer. During the fifth wait period the counter recycles. Attention is called to the fact that, as explained heretofore, the counter circuit cannot begin counting unless relay K2 operates. Since relay K2 is controlled by a transistor bit circuit, its operate time is rather slow. It may be, for instance, about 35 milliseconds. This delay period precludes the possibility of a readdress during the next transmitting frame of the system. At the top of FIG. 7 readdress SWITCH 1 is shown. This switch comprises four wafers, A, B, C and D. The wafers are rotatable clockwise and are under control of a common rotor, with which they are integral, so that all wafers are rotated in unison. The switch has four positions, as indicated by pointer 704 at the upper left in FIG. 7. It is commonly fixed in a "zero" or nonoperated position from which it may be rotated clockwise to three other discrete positions, indicated on the dial, at the upper left in FIG. 7, as positions 1, 2 and 3. Each of the wafers has a plurality of conducting segments which engage juxtaposed contacts in various positions. Switch A has three conducting segments numbered 1, 2 and 3. In the "zero" position, as shown, no one of the contacts engages segments 1. Contact 1 engates segment 2 and contact 3 engages segment 3. Since SWITCH 1 is rotatable clockwise, when it is operated to position 1, contact 2 will engage segment 2 and will thereby be connected to contact 1. It will be observed that certain of the segments on SWITCH 1 are uniform in width, as measured radially, while others of them are irregular. It will be observed also that the contacts juxtaposed the segments of the switch are in different positions radially with respect to the center of the switch. Those contacts closer to the center will engage the inner portion of a switch segment when the segment is in alignment with it. Those contacts farther from the center will make engagement with a segment only when there is a projection on the segment which has been operated into position to engage with such a contact. When switch 1 is in the "zero" position the entry timer control conductor 705 is grounded in FIG. 7. The circuit may be traced from the anode of entry timer control tube V234 through conductor 705, contact 2, segment 1, and contact 1 of wafer B of switch 1, contact 5, segment 1 and contact 1 of wafer B of switch 2 and then to ground.

It will now be assumed that there has been no reply from an addressed plane and that relay K2 is operated. The winding of relay K1 is normally shunted by a path through contact 3 of relay K2. With this contact open, during the next wait period, relay K1 is operated when tube V232 is activated. It is explained that relay K2 remains operated as long as a no-reply condition persists. It will be assumed that switch 1 has been set for the single readdress condition. Under this condition, as explained in the foregoing, FIG. 7 is arranged as a four-stage counter presenting the low RC value to the data multiplex timer on the odd counts, that is, during the first and third wait periods. During the second and fourth wait periods, the RC value selected on the message rate switch 2 is presented and on the fifth count the timer recycles.

During the first wait period tube V232 is activated operating relay K1 and grounding its contact 1. A path is then established which may be traced from positive battery 703, at the upper left in FIG. 7, through contact 2 of relay K2, contact 1, segment 2 and contact 2 of wafer A of switch 1, contact 706, terminal 713, winding of relay K10, contact 5 of relay K11, contact 4, segment 4 and contact 5 of wafer D of switch 1, contact 1 of relay K21, contact 1 of relay K31, contact 1 of relay K41 and contact 1 of relay K1 to ground operating relay K10. The operation of relay K10 in response to the first wait interval connects the low valued RC circuit to the timer in the following manner. A source of positive potential is connected through resistor R1, contact 2 of relay K10, contact 2 of relay K11, contact 5, segment 2, and contact 6 of wafer B of switch 1, contact 3 of relay K20, contact 3 of relay K30, conductor 705, through activated entry timer control tube V234 and from the anode to the cathode thereof and to ground. Resistor R1 and the distributed capacitance of the circuit connected through the entry timer tube constitute the low valued RC circuit.

At this point, attention is called to switch 2 which controls the value of the RC constant connected to the data multiplex when it is operatively connected in circuit. This switch in general resembles switch 1 except that it comprises three wafers, wafers A, B, and C rather than four wafers as in switch 1. Further switch 2 is operable to nine different positions. It is normally at rest on position "zero" as indicated by arrow 711 on the dial, shown at the lower left in FIG. 7, and may be operated clockwise to any of eight other discrete positions to connect different values of capacitance and resistors into the circuit to provide eight uniformly graduated values of the RC constant.

After relay K10 is operated, and before the start of the second wait period, relay K11 will operate in the following manner. It was shown in the foregoing that battery 703 is connected to the left-hand terminal 713 of relay K10 and this terminal will be considered hereinafter at the battery source to eliminate unnecessary repetition in tracing the circuits. After relay K10 is operated, the ground supplied by contact 1 of relay K1 is replaced with ground on contact 3 of relay K21 which maintains relays K10 and K11 operated in series with battery 703. The circuit may be traced from ground through contact 3 of relay K21, contact 5, segment 3 and contact 4 of wafer C of switch 1, contact 1 of relay K10, now operated, winding of relay K11, and winding of relay K10 to terminal 713, from which point the circuit has been traced to battery 703. During the second wait period, relay K20 is operated in the following manner. Relay K1 first operates, as described. This establishes a circuit which may be traced from ground through contact 1 of relay K1, contact 1 of relay K41, contact 1 of relay K31, contact 1 of relay K21, contact 5, segment 4 and contact 4 of wafer D of switch 1, contact 4 of relay K11, which is now operated, and winding of relay 20 to terminal 713, from which point the circuit has been traced to battery 703, operating relay K20. When relay K20 operates, it connects capacitances and resistors established on switch 2 to the entry timer control. The circuit may be traced from positive battery through resistor R3 to its lower terminal. The lower terminal of resistor R3 connects, in parallel, to contact 1 of wafer A, contact 4 of wafer B and contact 1 of wafer C of switch 2. Switch 2 may be adjusted to connect any combination of the capacitances associated with wafers A and B to the lower terminal of resistor 3. Each of the capacitances is grounded. Wafer C of switch 2 may connect resistor R4 in parallel with resistor R3. From the junction 723 between the resistors and capacitors, the circuit continues through contact 3 of relay K11, contact 5, segment 2 and contact 7 of wafer B of switch 1, contact 3 of relay K30, and through conductor 705 to the entry timer control.

After the operation of relay K20, during the second timing interval, relay K21 operates. The circuit may be traced from ground through terminal 5 of relay K31, contact 1 of relay K20, winding of relay K21 and the winding of relay K20 to terminal 713 which was shown to connect to battery 703. The operation of relay 21 releases relays 10 and 11 by opening contact 30 of relay K21.

During the third wait interval, relay K30 operates. The path may be traced from ground through terminal 1 of relay K1, terminal 1 of relay K41, terminal 1 of relay K31, contact 2 of relay K21 and the winding of relay K30 through terminal 713 to battery. The operation of relay K30 again connects the timer circuit having the low RC value to the data multiplex. The circuit may be traced from positive battery through resistor R1, terminal 2 of relay K30, and terminal 3 of relay K31 to conductor 705.

Shortly after relay K30 operates during the third wait period, relay K31 is operated. The circuit may be traced from ground through contact 3 of relay K41, contact 1 of relay K30, winding of relay K31 and winding of relay K30 to battery through terminal 713. The operation of relay K31, by opening contact 5 of relay K31, releases relays K20 and K21.

During the fourth wait interval relay K1 is again operated, as explained. A circuit may then be traced from ground through contact 1 of relay K1, contact 1 of relay K41, contact 2 of relay K31, and winding of relay K40 through terminal 713 to battery. The operation of relay K40 again connects switch 2 into the circuit to provide whatever value of RC constant may have been established thereon through its setting.

It will be recalled that terminal 723 is at the junction between the lower terminal of resistor R3 and whatever capacitances may be established in the RC circuit through the operation of switch 2. In certain positions of switch 2, resistor R4 is connected in parallel with resistor R3 in this circuit. Terminal 723 will hereafter be used as a reference point in tracing circuits established by the various relays when the timing circuit having the higher valued RC constant is to be connected to the multiplex circuit.

A circuit may be traced from terminal 723 through contacts 3 of relays K10 and K20 both of which are now released and through contact 4 of relay K31, which is presently operated, to conductor 705 so that the timing circuit having the higher valued RC constant is employed for this particular condition of the switching relays. The operation of relay K40, by closing its contact 1, established a circuit which may be traced from ground through contact 1 of relay K11, contact 1, segment 2 and contact 2 of wafer C of switch 1, contact 1 of relay K40, winding of relay K41 and winding of relay K40 through terminal 713 to battery operating relay K41. As a result of this, relays K41 and K40 are operated in series to ground through contact 1 of relay 1 in preparation for recycling of the circuit. The operation of relay K41, by opening contact 3 of relay K41, releases relays K30 and K31.

Assuming that there is no reply, relay K1 will again operate during the next wait period, this will establish a circuit from ground through contact 1 of relay K1, contact 2 of relay K41 which is not operated, contact 2, segment 2 and contact 1 of wafer D of switch 1 through the winding of relay K10 and terminal 713 to battery operating relay K10. While relay K10 is operated and prior to the operation of relay K11, battery will be connected through resistor R1, contact 2 of relay K10, contact 2 of relay K11, contact 5, segment 2 and contact 6 of wafer B of switch 1, contact 3 of relay K20 and contact 3 of relay K30 to conductor 705 again connecting the timing circuit having the lower value of the RC constant to the multiplex.

The cycle of operations described in the foregoing connects timing circuits having a low valued and a high valued RC constant to the data multiplex on alternate counts. This effects one readdress on the odd counts through the use of the timer having a low valued constant and a normal connection to the multiplex on the even counts using the higher valued constant established through the operation of switch 2.

The manner in which the circuit functions for double readdress will now be described. On this cycle of operation the circuit is arranged as a three-stage counter and the timing circuit having the low valued RC constant is connected to the data multiplex during the first and second wait periods and the timing circuit having the higher valued constant on the third wait period. The circuit recycles during the fourth wait period. In order to set the circuit for this condition, multiple wafer switch 1 is operated to its second position. That is to say, all segments of the switch are rotated in unison two positions in advance clockwise. With switch 1 in this position, on wafer A, contacts 1 and 2 will be in engagement through segment 2. Contacts 3 and 4 will be in engagement through segment 3 of wafer A. On wafer B, contacts 3 and 4 will be in engagement through segment 1. Contacts 6 and 8 will be in engagement through segment 20 of wafer B. Other contacts on the wafer B will not be engaged in this condition. On wafer C, contacts 2 and 3 will be in engagement through segment 2. Contacts 2 and 3 will be in engagement through segment 2 of wafer D. Contacts 5 and 6 will be in engagement through segment 4 of wafer D. Other contacts on wafer D will not be engaged when the switch has been advanced two positions clockwise. For the double address relays K10 and K11 remain in their normal unoperated conditions throughout. The three pairs of relays, namely, relays K20 and K21, K30 and K31, K40 and K41 are operated in substantially the same manner as described heretofore and then recycle starting first with relays K20 and K21 and recycling again to this same pair. The timing circuit having the low value RC constant is employed for the first and second wait period and that having the high value constant for the third.

For this condition when relay K1 operates, during the first wait period, a circuit is established from ground through contact 1 of relay K1, contact 1 of relay K41, contact 1 of relay K31, contact 1 of relay K21, contact 5, segment 4 and contact 6 of wafer D of switch 1, winding of relay 20, terminal 713, contact 706, contact 2, segment 2 and contact 1 of wafer A of switch 1 and contact 2 of relay K2 to battery 703. Relay K20 operates. The operation of relay K20 connects resistor R1 and the distributed capacitance to conductor 705. The path may be traced from battery through resistor R1, contact 3, segment 1 and contact 4 of wafer B of switch 1, contact 2 of relay K20 which is now closed, and contact 3 of relay K30 to conductor 705 which connects to the mulitplex circuit. The operation of relay K20, by closing its contact 1, establishes a circuit, during the first wait period, from ground on contact 5 of relay K31 through contact 1 of relay K20, winding of relay K21, and the winding of relay K20, which extends through terminal 713 to battery operating relay K21 in series with relay K20.

During the second waiting period for double readdress operation, relay K1 again operates and closes a circuit from ground through contact 1 of relay K1, contact 1 of relay k41, contact 1 of relay K31, contact 2 of relay K21, winding of relay K30 and through terminal 713 to battery 703 operating relay K30. At the present time, therefore, relays K20, K21, and K30 are operated and relay K31 is released. Resistor R1 and the distributed capacitance is again connected through conductor 705 to the multiplex circuit. The path may be traced from battery through resistor R1, contact 2 of relay K30 and contact 3 of relay K31 to conductor 705. The operation of relay K30, during the second wait period, establishes a circuit from ground through contact 3 of relay K41, contact 1 of relay K30, winding of relay K31, winding of relay K30 and through terminal 713 to battery 703 maintaining relay K30 operated and operating relay K31. The operation of relay K31 releases relays K20 and K21, when contact 3 of relay K31 is opened.

During the next, or third, waiting interval, relay K1 is again operated. A circuit may now be traced from ground through contact 1 of relay K1, contact 1 of relay K41, contact 2 of relay K31, winding of relay K40 and through terminal 713 to battery 703 operating relay K40. This connects the high valued RC timers to the multiplex. The circuit may be traced from terminal 723 through contact 3 of relay K10, contact 3 of relay K20, contact 4 of relay K31, which is not operated and conductor 705 to the multiplex circuit. The operation of relay K40, during the third waiting period, establishes a circuit from ground through contact 3 of relay K21, contact 3, segment 2 and contact 2 of wafer C of switch 1, contact 1 of relay K40, winding of relay K41 and winding of relay K40 through terminal 713 to battery 703 operating relay K41 in series with relay K40, and substituting ground through contact 3 of relay K21 for the ground through contact 1 of relay K1. The operation of relay K41 releases relays K30 and K31.

During the fourth wait period of double readdress, when relay K1 operates, ground is supplied through contact 1 of relay K1, contact 20 of relay K41, contact 2, segment 2 and contact 3 of wafer D of switch 1, winding of relay K20 and through terminal 713 to battery 703 operating relay K20. The low valued RC timer circuit is connected to the multiplex from terminal 723 through contact 3, segment 1 and contact 4 of wafer B of switch 1, contact 2 of relay K20, contact 3 of relay K30 and conductor 705 to the multiplex circuit. After relay K20 operates, during the fourth wait period, relay K21 operates from ground on relay K31 through contact 1 of relay K20, winding of relay K21, contact 3, segment 2, contact 2 of wafer D of switch 1, contact 2 of relay K41 and conductor 705 to the multiplex circuit. The operation of relay K21, by opening its contact 3 releases relays K40 and K41 and completes recycling of the circuit.

The manner in which the readdress circuit of FIG. 7 functions for triple readdress will now be described. For triple readdress, switch 1 is advanced to the third clockwise position from the normal position of rest. The eight relays of FIG. 7 are again arranged as a four-stage counter as for single readdress. This time, however, the low valued RC timer circuit is connected to the data multiplex during the first, second and third waiting period. During the fourth waiting period the timer circuit operates at the higher RC value established on switch 2 and during the fifth waiting period the circuit recycles.

The manner in which the circuit of FIG. 7 operates for triple readdress will now be described.

First, the condition of switch 1 will be described and the circuits established through the segments of the four wafers thereon will be traced. For triple readdress each of the four wafers of switch 1 will be rotated clockwise three steps. With respect to wafer 1, contacts 1 and 2 will be interconnected through segment 2. Contacts 3 and 4 will be interconnected through segment 3. Attention is called to the fact that the connections through wafer A remain unchanged while it is in positions 1, 2 and 3 and the path from terminal 713 to battery is available for each of these switch positions. With respect to wafer B, contacts 6, 7 and 8 will be interconnected through segment 2 and the other contacts associated with wafer B will not be interconnected. With respect to wafer C contacts 1 and 2 will be interconnected through segment 1 and contacts 4 and 6 will be interconnected through segment 3. Other contacts associated with wafer C will not be interconnected. With respect to wafer D, contacts 1 and 2 will be interconnected through segment 1 and contacts 4 and 5 will be interconnected through segment 3, while other contacts associated with wafer D are not interconnected.

After relay K2 is operated for the no-reply condition for triple readdress, relay K1 will be operated, as explained, once during each waiting interval. During the first waiting interval, a circuit is established from ground through contact 1 of relay K1, contact 1 of relay K41, contact 1 of relay K31, contact 1 of relay K21, contact 5, segment 3 and contact 4 of wafer D of switch 1, contact 5 of relay K11 and winding of relay K10 through terminal 713 to battery operating relay K10. With relay K10 operated, the low valued RC circuit is connected to the data multiplex over a circuit which may be traced from positive battery through resistor R1, contact 2 of relay K10, contact 8, segment 2 and contact 7 of wafer B of switch 1 and contact 3 of relay K30 through conductor 705 to the data multiplex. After relay K10 operates, a circuit may be traced from ground through contact 5 of relay K31, contact 6, segment 3 and conact 4 of wafer C of switch 1, contact 1 of relay K10, winding of relay K11, and winding of relay K10 to terminal 713 in the path which has heretofore been traced to positive battery 703. This operates relay K11 in series with relay K10 and substitutes the ground through contact 5 of relay K31 for the ground through contact 1 of relay K1. As explained, relay K2 remains operated while the no-reply condition persists and relay K1 is operated once during each waiting interval during this period. In response to the second operation of relay K1, during triple readdress, a circuit may be traced from ground through contact 1 of relay K1, contact 1 of relay K41, contact 1 of relay K31, contact 1 of relay K21, contact 5, segment 3 and contact 4 of wafer D of switch 1, contact 4 of relay K11, winding of relay K20 and through terminal 713 in the path to battery 703 operating relay K20. When relay K20 operates, the low-valued RC constant timer remains connected to the multiplex circuit over the same path at last traced. When relay K20 operates, a circuit may be traced from ground through contact 5 of relay K31, contact 1 of relay K20, winding of relay K21, winding of relay K20 through terminal 713 to battery 703 operating relay K21. When relay K1 is operated during the third waiting interval, a circuit is established from ground through contact 1 of relay K1, contact 1 of relay K41, contact 1 of relay K31, contact 2 of relay K21, winding of relay K30 and through terminal 713 in the path to battery 703 operating relay K30. The low valued RC timer is connected to the multiplex through contact 2 of relay K30, contact 3 of relay K31 and conductor 705 which extends to the muliplex circuit. When relay K30 operates, a circuit may be traced from ground through contact 3 of relay K41, contact 1 of relay K30, winding of relay K31, winding of relay K30 and through terminal 713 in the path to battery 703, operating relay K31. The operation of relay K31 released relays K10 and K11 and relays K20 and K21. When relay K40 operates, the RC timing circuit established through the operation of switch 2, which is the higher valued timing circuit, is connected to the data multiplex.

When relay K1 operates, during the fourth waiting interval, a circuit is established from ground through contact 1 of relay K1, contact 1 of relay K41, contact 2 of relay K31, winding of relay K40 and through terminal 713 in the path to battery 703 operating relay K40. The circuit having the higher valued RC constant is connected to the multiplex. The circuit may be traced from terminal 723 through contact 3 of relay K10, contact 3 of relay K20, contact 4 of relay K31, which is operated, and through conductor 705 to the multiplexing circuit. When relay K40 operated during the fourth waiting period for triple readdress, a circuit may be traced from ground through contact 1 of relay K11, contact 1, segment 1 and contact 2 of wafer C of switch 1, contact 1 of relay K40, winding of relay K41, winding of relay K40 and through terminal 713 to battery 703 operating relay K41 and releasing K30 and K31.

When relay K1 operates during the fifth waiting interval, a circuit may be traced from ground through contact 1 of relay K1, contact 2 of relay K41, contact 2, segment 1 and contact 1 of wafer D of switch 1, winding of relay K10 and through terminal 713 to battery 703 operating relay K10. When relay K10 operates, a circuit may be traced from battery through resistor R1, contact 2 of relay R10, contact 8, segment 2 and contact 7 of wafer B of switch 1, contact 3 of relay K30 and through conductor 705 to connect the timer having the low RC constant to the muliplex circuit. When relay K10 operates during the fifth waiting interval for triple readdress relay K11 operates from ground through contact 5 of relay K31, contact 6, segment 3 and contact 4 of wafer C of switch 1, contact 1 of relay K10, winding of relay K11, winding of relay K10 and through terminal 713 to battery operating relays K10 and K11 in series. The operation of relay K11 by opening its contact 1 released relays K40 and K41 and the recycling of the circuit is completed.

It has been shown, therefore, that when the triple readdress function is selected through the operation of switch 1 in FIG. 7, the low valued RC timing circuit is connected to the multiplex during the first three waiting periods and the higher valued RC timing circuit is connected to the multiplex during the fourth waiting period and that the circuit recycles during the fifth waiting period, the circuit of FIG. 7 being arranged as a four-stage counting circuit for this function.

It should be emphasized that switch 2 may be adjusted to any one of nine positions. In the first or zero position, the timing circuit in the data multiplex is connected directly to ground. As switch 2 is actuated, any one of the eight higher values of the RC timing circuit may be established in the high valued timer in progressive linear steps.

If a reply is received, relay K2 releases. This disconnects battery 703 from the counting relays of FIG. 7 when contact 2 of relay K2 is opened disconnecting the readdress feature.

What is claimed is:
1. In a high-speed radio data transmission system, a central control station, a plurality of outlying mobile stations, means in said system for selectively calling any of said mobile stations at a first time in an ordered sequence at a normal rate, a readdress circuit in said transmission system, said readdress circuit having means responsive to a non-reply, incident to said addressing, for selectively readdressing any one of said outlying stations at a second time in a preferred sequence at a rate faster than said normal rate.

2. A high-speed radio data transmission system having a central station and a plurality of outlying mobile stations, a control position individual to each of said outlying stations at said central control station, multiplexing equipment at said central station common to all of said control positions, means at each of said control positions for producing a train of signals, including a selective address and intelligence signals, for its individual outlying station, said multiplexing equipment comprising a common timer, a common counter and a common selector, an individual selectable element in said selector for each of said control positions, means in said equipment responsive to said timer and said counter for sensing said elements in said selector in an order sequence, a radio transmitter, means in said equipment responsive to a ready condition imposed by any of said control positions on its individual element in said selector for connecting the corresponding control position to said radio transmitter, a position ready timing control circuit in each control position for establishing a waiting interval between successive connections of any control position to said transmitter before a control position may reapply said ready condition to its individual element in said selector, and means, responsive to a non-reply from an addressed mobile station, for reducing said interval, to afford a control position preferred access to said radio transmitter.

3. A system in accordance with claim 2, including a readdress counting circuit, and means connected to said counting circuit, responsive to the non-reception by any control position of a reply from its addressed outlying station, for connecting said non-receiving control position to said radio transmitter preferentially a number of times, as established by said counting circuit.

4. A system in accordance with claim 2 including means connected to said readdress counting circuit, responsive to a non-reply, and incident to the setting of said counting circuit, for connecting said non-receiving control position to said transmitter after a normal waiting interval on certain counts and after a reduced interval on other counts of said readdress counting circuits.

5. A high-speed data transmission system comprising a central station, a plurality of control positions connected to said central station, a transmitter connected to said central station, an individual mobile station for each of said positions, means at said central station for polling all of said control positions to find any of said positions which is ready to transmit to its individual mobile station, means at said central station, responsive to the finding of a control position which is ready to transmit, for connecting it to said transmitter, means in a control position connected to a transmitter for selectively directing intelligence to its individual mobile station, timng means at said central station for directing a reply from a selectively addressed mobile station to its individual control position after a measured interval and means at said central station, responsive to the elapse of said interval and the non-reception of a reply by any control position from its individual mobile station, for connecting that control position to said transmitter preferentially.

6. A system in accordance with claim 5 including an adjustable timing circuit, for establishing a waiting interval, after a program of operation, before a control position may be reconnected to said transmitter and means connected to said adjustable timing circuit responsive to the non-reception of a reply by any control position for adjusting said timing circuit for operation on a shortened interval.

7. A data transmission system having a central control station and a plurality of outlying stations, means at said control station for selectively addressing and transmitting a message to any one of said outlying stations, means at any of said selected stations responsive to the reception of said message for transmitting a reply to said control station, and a readdress circuit at said control station responsive to the nonreception of a reply from any addressed outlying station for selectively addressing and readdressing that station at a plurality of differing predetermined rates.

* * * * *